United States Patent
Mikawa

(10) Patent No.: US 8,942,910 B2
(45) Date of Patent: Jan. 27, 2015

(54) CONTROL DEVICE AND METHOD FOR CONTROLLING VARIABLE VALVE TIMING MECHANISM IN INTERNAL COMBUSTION ENGINE

(75) Inventor: Kentaro Mikawa, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 285 days.

(21) Appl. No.: 13/618,550

(22) Filed: Sep. 14, 2012

(65) Prior Publication Data

US 2013/0068185 A1 Mar. 21, 2013

(30) Foreign Application Priority Data

Sep. 20, 2011 (JP) ................... 2011-205391

(51) Int. Cl.
| | | |
|---|---|---|
| F01L 1/34 | (2006.01) | |
| F02D 45/00 | (2006.01) | |
| F01L 1/04 | (2006.01) | |
| F02D 41/00 | (2006.01) | |
| F01L 1/352 | (2006.01) | |
| G01M 15/04 | (2006.01) | |

(52) U.S. Cl.
CPC ............... F01L 1/04 (2013.01); F02D 41/009 (2013.01); F01L 1/352 (2013.01); Y02T 10/142 (2013.01); F01L 2820/032 (2013.01); F02D 2041/001 (2013.01); F02D 2250/06 (2013.01)
USPC ........................................ 701/103; 123/90.17

(58) Field of Classification Search
USPC ................. 701/103, 105, 102, 114; 123/90.15–90.17, 90.31
See application file for complete search history.

(56) References Cited

U.S. PATENT DOCUMENTS

| | | | |
|---|---|---|---|
| 6,492,804 B2 | 12/2002 | Tsuge et al. | |
| 7,191,055 B2 * | 3/2007 | Miyakoshi | ............... 701/114 |
| 7,912,624 B2 | 3/2011 | Schafer et al. | |
| 7,949,461 B2 * | 5/2011 | Takahashi | .................... 701/111 |
| 2001/0002791 A1 | 6/2001 | Tsuge et al. | |
| 2008/0017149 A1 * | 1/2008 | Kokubo et al. | ............ 123/90.16 |
| 2009/0276145 A1 | 11/2009 | Schafer et al. | |

FOREIGN PATENT DOCUMENTS

| | | |
|---|---|---|
| JP | 2001-165951 A | 6/2001 |
| JP | 2004-162706 A | 6/2004 |
| JP | 2005-299640 A | 10/2005 |
| JP | 4123127 B2 | 5/2008 |
| JP | 2009-533592 A | 9/2009 |
| JP | 2011-132808 A | 7/2011 |

* cited by examiner

Primary Examiner — Hieu T Vo
(74) Attorney, Agent, or Firm — Foley & Lardner LLP

(57) ABSTRACT

Even when a crankshaft reversely rotates, a rotation phase of a camshaft can be accurately detected. A motor shaft rotation angle, a crankshaft forward rotation angle, a crankshaft reverse rotation angle, a final crankshaft rotation angle, a sprocket rotation angle of an electric VTC where a sprocket rotates at ½ rotation speed of the crankshaft and a stator of an electric motor are integrally rotated, a motor shaft rotation angle changing amount during a control period, a sprocket rotation angle changing amount, a motor shaft rotation angle changing amount, an intake camshaft rotation angle changing amount, and a current real rotation angle of the intake camshaft are calculated sequentially, and the VTC manipulated variable is computed so that the VTC real angle follows a VTC target angle.

18 Claims, 20 Drawing Sheets

DURING
MIRROR CYCLE
OPERATION

DURING STARTING

CONTROL DEVICE AND METHOD FOR CONTROLLING VARIABLE VALVE TIMING MECHANISM IN INTERNAL COMBUSTION ENGINE

BACKGROUND OF THE INVENTION

1. Field of the Invention

The present invention relates to a control device and a method for controlling a variable valve timing mechanism which varies valve timing of an engine valve (an intake valve or an exhaust value) of an internal combustion engine.

2. Description of Related Art

A control device of this type of variable valve timing mechanism controls valve timing by detecting the rotation phase of a camshaft with respect to a crankshaft and bringing the rotation phase close to a target rotation phase by using the variable valve timing mechanism.

In a control device of a variable valve timing mechanism disclosed in Japanese Patent No. 4123127, in a variable valve timing mechanism which drives a camshaft for opening and closing an intake valve using an electric motor, rotation signal of a motor shaft, of which frequency of detection per unit rotation angle of a camshaft is large compared with a rotation angle sensor provided on the camshaft, is used, thereby achieving the valve timing control with high accuracy in an engine lower speed area.

However, the crankshaft may rotate in a reverse direction to a forward rotation direction (reverse rotation) at a time of extremely low rotation of an engine just before a stopping, such as when operation of the engine is stopped. In the control device of the variable valve timing mechanism disclosed in Japanese Patent No. 4123127 described above, in a case of reverse rotation, the rotation phase of the camshaft cannot be detected correctly. Thus, for example, in a case in which a valve timing of the intake valve is controlled to a valve timing for starting during engine stopping process, preferable valve timing control has not been achieved.

SUMMARY OF THE INVENTION

Therefore, in view of the problems of the related art, an object of the present invention is to provide a control device and a method for a variable valve timing mechanism in which a rotation phase of a camshaft can be detected with high accuracy and preferable valve timing control is performed, even in a case in which the crankshaft reversely rotates.

In order to achieve the object described above, a control device of a variable valve timing mechanism in an internal combustion engine according to an aspect of the present invention, includes: a crank angle sensor which detects a rotation angle of a crankshaft; a cam sensor which detects a rotation angle of a camshaft for opening and closing an engine valve; a first rotation phase detection unit which detects a rotation phase of the camshaft with respect to the crankshaft based on respective signals from the crank angle sensor and the cam sensor;

an actuator which relatively rotates the camshaft with respect to the crankshaft and is able to change the rotation phase;

a control unit which drives the actuator based on the detected value of the rotation phase and performs feedback control to control the rotation phase to approach a target value.

The control device further includes: forward rotation and reverse rotation detection unit which determines and detects forward rotation and reverse rotation of the crankshaft; an actuator rotation sensor which detects a rotation operation amount including the rotation direction of the actuator with a frequency higher than a frequency of rotation phase detection by the first rotation phase detection unit; and a second rotation phase detection unit which detects a camshaft rotation phase with a frequency higher than that of the first rotation phase detection unit, based on the detection result of forward rotation and reverse rotation of the crankshaft and the rotation operation amount including the rotation direction of the actuator.

In order to achieve the object described above, a control method of a variable valve timing mechanism in an internal combustion engine according to an aspect of the present invention, includes the steps of:

detecting a rotation angle of a crankshaft and a rotation angle of a camshaft for opening and closing an engine valve;

detecting a rotation phase of the camshaft with respect to the crankshaft as a first rotation phase based on the respective signals of the rotation angle of the crankshaft and the rotation angle of the camshaft for opening and closing the engine valve; driving an actuator which relatively rotates the camshaft with respect to the crankshaft and is able to change the first rotation phase, to thereby perform feedback control to control the rotation phase to approach a target value based on the detected value of the rotation phase.

The control method further including: determining and detecting forward rotation and reverse rotation of the crankshaft; detecting a rotation operation amount including the rotation direction of the actuator with a frequency higher than frequency of the detection of the first rotation; and detecting a camshaft rotation phase as a second rotation phase with a frequency higher than that of the first rotation phase, based on the detection result of forward rotation and reverse rotation of the crankshaft and the rotation operation amount including the rotation direction of the actuator.

The other objects and features of this invention will be understood from the following description with reference to the accompanying drawings.

BRIEF DESCRIPTION OF THE DRAWINGS

FIG. 6A illustrates valve timing at the time of mirror cycle operation after starting and FIG. 6B illustrates valve timing at the time of starting;

DESCRIPTION OF THE PREFERRED EMBODIMENTS

Hereinafter, an embodiment of the present invention is described with reference to the drawings.

Figure 1:
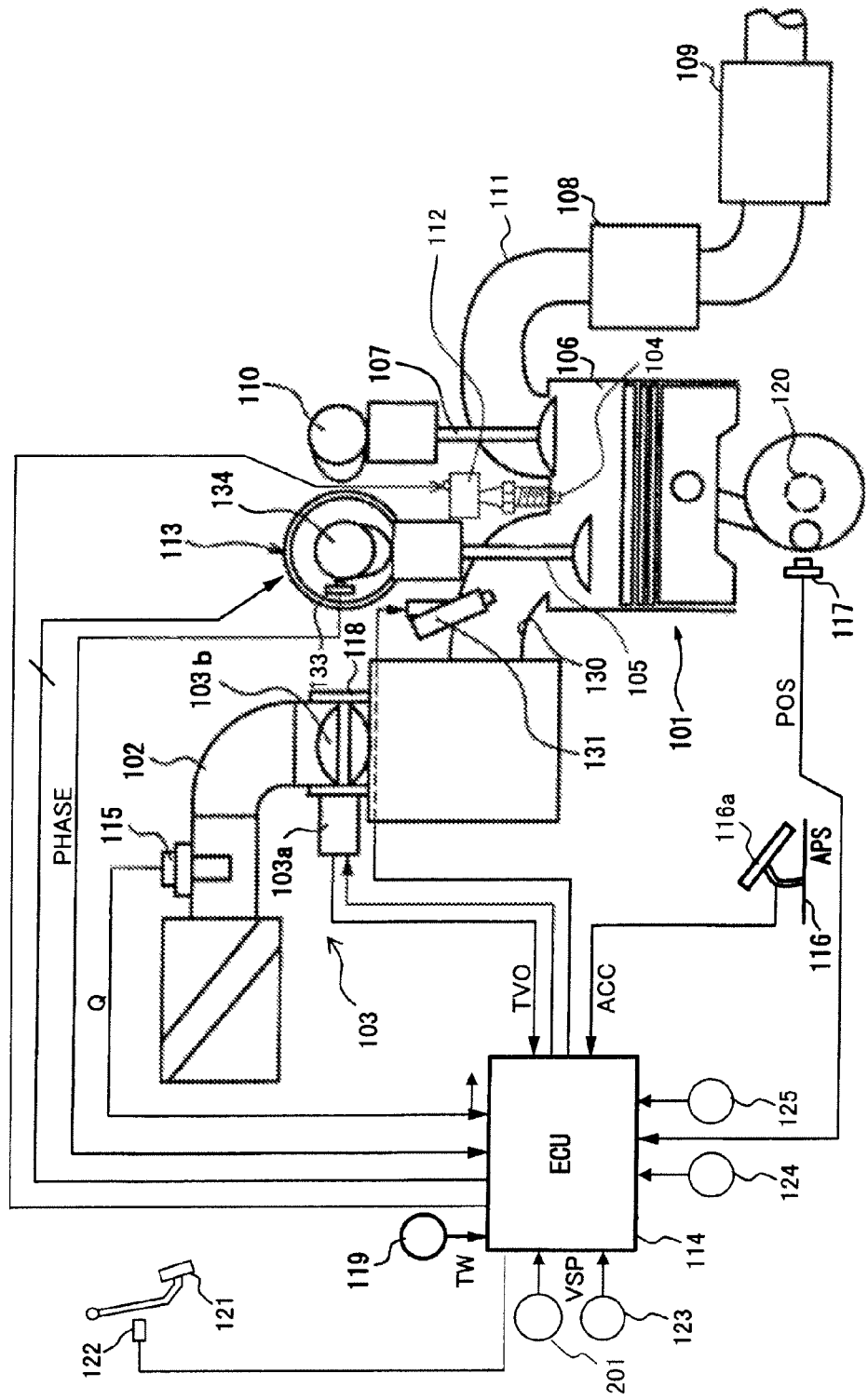
FIG. 1 is a system configuration view illustrating an internal combustion engine in an embodiment of the invention.

FIG. 1 is a configuration view of an internal combustion engine 101 for a vehicle to which a control device of an embodiment of the present invention is applied. In addition, internal combustion engine 101 is a four cycle engine with four in-line cylinders in the embodiment, however, the present invention is not limited to the example.

An electronic control throttle 103, which opens and closes a throttle valve 103b with a throttle motor 103a, is provided in an intake pipe 102 of internal combustion engine 101 in FIG. 1.

Thus, internal combustion engine 101 intakes air inside a combustion chamber 106 of each cylinder via electronic control throttle 103 and an intake valve 105.

An intake port 130 of each cylinder is provided with a fuel injection valve 131. Fuel injection valve 131 opens in response to an injection pulse signal from an ECU (an engine control unit) 114 acting as a control device and injects fuel.

The fuel inside a combustion chamber 106 is ignited and combusted by spark ignition using an ignition plug 104. Each ignition plug 104 has an ignition module 112 in which a power transistor is provided. The power transistor controls an ignition coil and the supply of power to the ignition coil.

Combustion gas inside combustion chamber 106 flows out into an exhaust pipe 111 via an exhaust valve 107. A front catalytic converter 108 and a rear catalytic converter 109 provided in exhaust pipe 111 purify the exhaust gas flowing through exhaust pipe 111.

An intake camshaft 134 and an exhaust camshaft 110 integrally include a cam, and intake valve 105 and exhaust valve 107 are driven by the cam.

Intake valve 105 has a configuration such that the valve timing is variably controlled by a variable valve timing mechanism (an electric VTC) 113 which rotates intake camshaft 134 relatively to crankshaft 120 using an electric motor (an actuator).

ECU 114 has a microcomputer therein and performs computation according to a program stored in advance in memory. ECU 114 controls electronic control throttle 103, fuel injection valve 131, ignition module 112 or the like.

ECU 114 inputs detection signals from various sensors. As the various sensors, an accelerator opening sensor 116 which detects an opening (an accelerator opening) ACC of an accelerator pedal 116a, an air flow sensor 115 which detects an intake air amount Q of internal combustion engine 101, a crank angle sensor (a rotation sensor) 117 which outputs a rotation signal (a unit crank angle signal) POS having a pulse shape according to the rotation of crankshaft 120 that is the output shaft of internal combustion engine 101, a throttle sensor 118 which detects an opening TVO of throttle valve 103b, a water temperature sensor 119 which detects a temperature TW of a coolant for internal combustion engine 101, a cam sensor 133 which outputs a cam signal PHASE having a pulse shape according to the rotation of intake camshaft 134, a motor rotation sensor 201 which detects the motor shaft rotation angle of the electric motor driving electric VTC 113, a brake switch 122 which becomes ON in a braking state in which the driver of the vehicle steps on brake pedal 121, a vehicle speed sensor 123 which detects the running speed (a vehicle speed) VSP of the vehicle in which internal combustion engine 101 is the power source, and the like are provided.

Furthermore, ECU 114 inputs ON and OFF signals of ignition switch 124, which is the main switch for driving and stopping of internal combustion engine 101, or ON and OFF signals of a stator switch 125.

Figure 2:
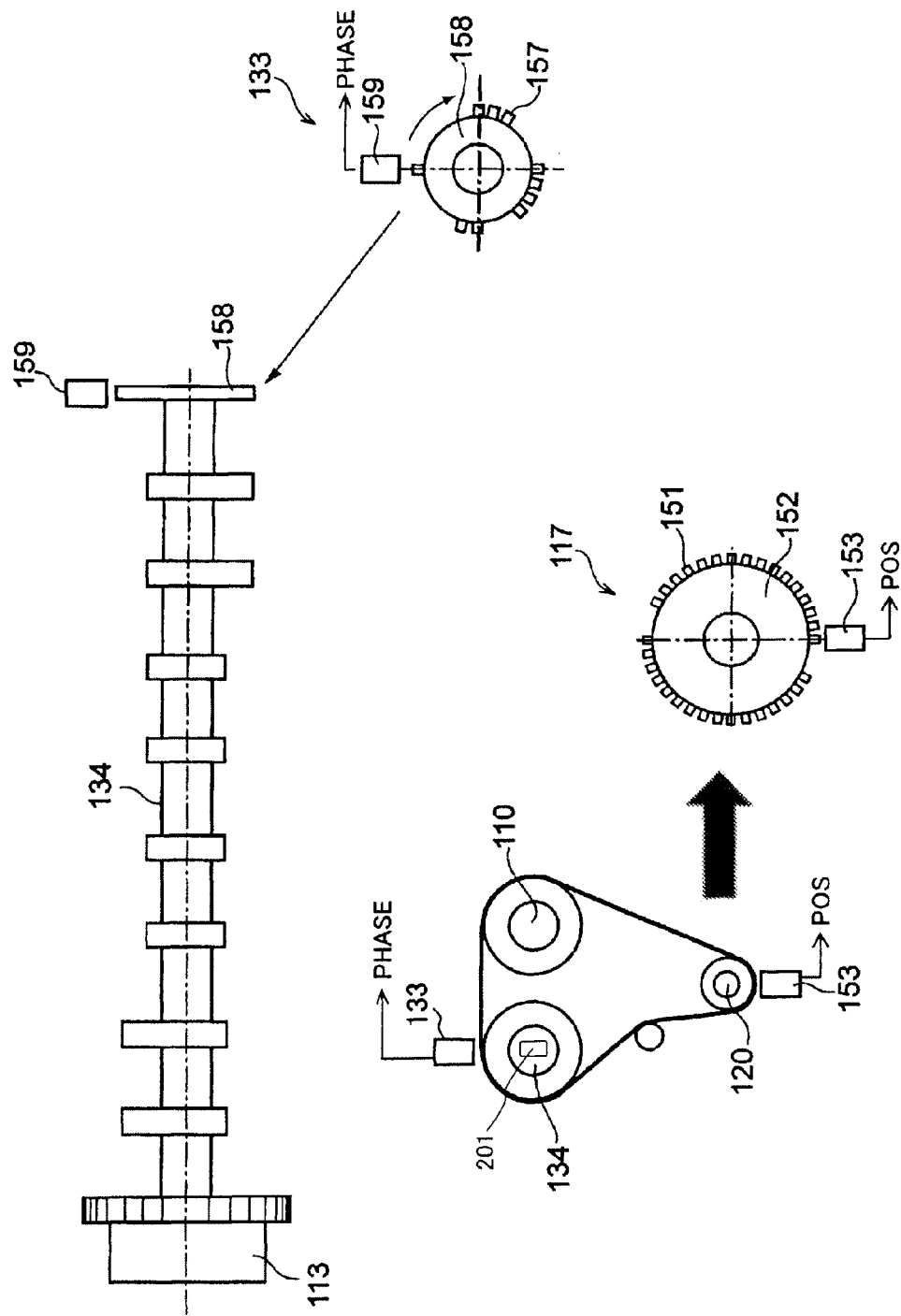
FIG. 2 is a view illustrating a structure of a crank angle sensor and a cam sensor in the embodiment.

FIG. 2 illustrates a structure of crank angle sensor 117 and cam sensor 133.

Crank angle sensor 117 includes a signal plate 152 and a rotation detecting device 153. Signal plate 152 is supported at crankshaft 120 and has, at its circumference, projection 151 which serves as an object to be detected. Rotation detecting device 153 is secured at the side of internal combustion engine 101, detects projection 151, and thereby outputs rotation signal POS.

Rotation detecting device 153 includes various processing circuits such as a wave form generating circuit and a selection circuit, and a pickup which detects projection 151. Rotation signal POS which is output by rotation detecting device 153 is a pulse signal formed of a pulse train which is normally a low level, and changes to a high level for a fixed time when projection 151 is detected.

Projection 151 of signal plate 152 is formed at regular intervals with a 10 degree pitch in the crank angle. There are two absent portions of projections 151. In each of the absent portions, two projections 151 are consecutively absent. The two absent portions are located at opposite sides of the central axis of crankshaft 120.

In addition, the number of the absent projections 151 may be one, or may be three or more, consecutively.

According to the arrangement described above, as illustrated in FIG. 3, the rotation signal POS which is output from crank angle sensor 117 (rotation detecting device 153) holds the low level for 30 degrees after changing to the high level 16 times continuously every 10 degrees (a unit crank angle) in the crank angle. The rotation signal POS again changes to the high level 16 times continuously.

Accordingly, initial rotation signal POS after the low level period of 30 degrees crank angle (an absent projection region and a absent portion) will be output at a 180 degree crank angle interval. In four-cylinder engine 101 of the embodiment, the 180 deg crank angle corresponds to a stroke phase difference between cylinders, in other words, to an ignition interval.

In addition, in the embodiment, crank angle sensor 117 is set such that initial rotation signal POS after the low level period (the absent projection region) in which the crank angle is 30 degrees is output at a piston position of 50 degrees (BTDC 50 degrees) before the dead center of the top of each cylinder.

Meanwhile, cam sensor 133 includes a signal plate 158 and a rotation detecting device 159. Signal plate 158 is rotatably supported to an end portion of intake camshaft 134 and has, on its circumference, a projection 157 which serves as a detected portion. Rotation detecting device 159 is secured at the side of internal combustion engine 101, and detects projection 157 and thereby outputs cam signal PHASE.

Rotation detecting device 159 includes various processing circuits such as a wave form shaping circuit, and a pickup which detects projection 157.

Projections 157 of signal plate 158 are provided such that one, three, four, and two respectively are located at four positions equally spaced apart every 90 degrees of the cam angle. A pitch of projection 157 is set to 30 degrees of the crank angle (15 degrees of the cam angle) at a portion in which a plurality of projections 157 is continuously provided.

Figure 3:
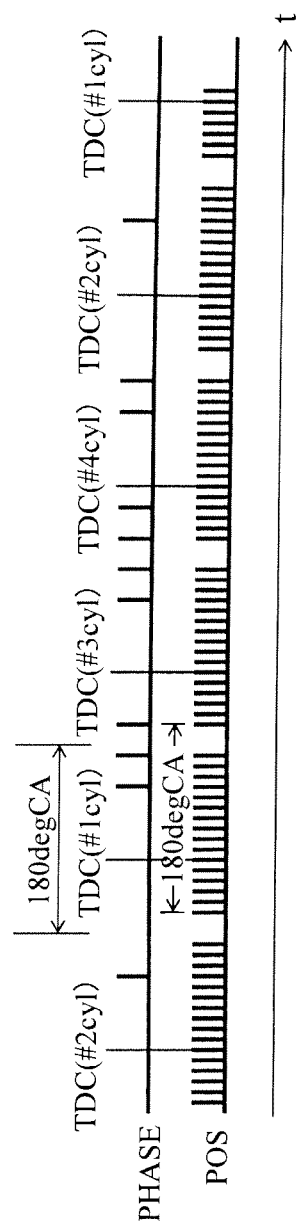
FIG. 3 is a time chart illustrating output characteristics of a crank angle sensor and a cam sensor in the embodiment.

Thus, as illustrated in FIG. 3, cam signal PHASE which is output from cam sensor 133 (rotation detecting device 159) is a pulse signal composed of a pulse train which is at the low level and changes to the high level only for a predetermined time when protrusion 157 is detected. In addition, cam signal PHASE changes to the high level for one projection alone, three consecutive projections, four consecutive projections and two consecutive projections for every 90 degrees of the cam angle and 180 degrees of the crank angle.

In addition, cam signal PHASE of one projection alone and the first signal of a plurality of cam signals PHASE output in succession are output at 180 degree intervals of the crank angle. The output patterns of one projection alone, the three consecutive projections, the four consecutive projections and the two consecutive projections are output respectively between the top dead center TDC of a certain cylinder and the top dead center TDC of the next cylinder. In addition, an output position and an output interval of cam signal PHASE are set in anticipation of the change range of the valve timing so that the output position of cam signal PHASE does not change across top dead center TDC even though valve timing of intake valve 105 is changed by the electric VTC.

More specifically, three consecutive cam signals PHASE are output between compression top dead center TDC of the first cylinder and compression top dead center TDC of the third cylinder. Four consecutive cam signals PHASE are output between compression top dead center TDC of the third cylinder and compression top dead center TDC of the fourth cylinder. Two consecutive cam signals PHASE are output between compression top dead center TDC of the fourth cylinder and compression top dead center TDC of the second cylinder. One cam signal PHASE is output between compression top dead center TDC of the second cylinder and compression top dead center TDC of the first cylinder.

The number of consecutive outputs of cam signal PHASE which is output between each top dead center TDC denotes the cylinder number which is to be the next compression top dead center. For example, in a case in which three consecutive cam signals PHASE are output between top dead center TDC of the current time and top dead center TDC of the previous time, top dead center TDC of this time denotes compression top dead center TDC of the third cylinder.

The ignition is performed in the order of the first cylinder, the third cylinder, the fourth cylinder and the second cylinder in four-cylinder engine 101 of the embodiment. Accordingly, as illustrated in FIG. 3, the output pattern of cam signal PHASE which is output between top dead centers TDC is set in the order of one signal alone, three consecutive signals, four consecutive signals, and two consecutive signals.

ECU 114 determines, for example, the projection absent positions of the rotation signal POS based on the change of the period of rotation signal POS. The number of generations of rotation signals POS is counted with reference to the projection absent positions and thereby top dead center TDC (reference crank angle position REF) is detected. In the embodiment, a sixth rotation signal POS output after the projection absent region of rotation signal POS, corresponds to top dead center TDC of each cylinder.

Thus, ECU 114 counts the number of outputs of cam signal PHASE output between top dead centers TDC so as to determine the next cylinder of which the piston position reaches compression top dead center TDC (a predetermined piston position), and also counts the number of generations of rotation signal POS from top dead center TDC, and to detect the crank angle at that time based on a counted value CNTPOS.

When the cylinder and the crank angle of compression top dead center TDC are detected, ECU 114 determines the cylinder to which the fuel is to be injected and which is to be ignited, fuel injection timing and the ignition timing. ECU 114 outputs the injection pulse signal or the ignition control signal according to the angle (the crank angle) of crankshaft 120 which is detected based on the counted value CNTPOS.

The determination result of the cylinder, of which the piston position reaches compression top dead center TDC (a predetermined piston position), is updated along the order of the ignition. Therefore, after determining the next cylinder of which position reaches compression top dead center TDC (a predetermined piston position) by counting the number of outputs of cam signal PHASE between top dead centers TDC, the cylinder of compression top dead center TDC can be updated along the order of the ignition every top dead center TDC.

In addition, an interval, during which the number of generations of cam signal PHASE is counted, is not limited to the period between top dead centers TDC. Instead, any crank angle (the piston position) may be the reference for the interval during which the number of generations of cam signal PHASE is counted.

Furthermore, the cylinder of which position is at the predetermined piston position can be determined based on the difference in the pulse width of cam signal PHASE or the like, instead of determining the cylinder of which a position is at the predetermined piston position based on the number of generations of cam signal PHASE.

In addition, in the embodiment, a part of the pulse train of rotation signal POS is absent so as to make it possible to detect the angle position (the crank angle) of crankshaft 120 by using the absent position as the reference. However, rotation signal POS may be output every 10 degrees without absent portion, and then a reference position sensor which generates the signal at the reference crank angle position every 180 degrees of the crank angle is provided instead and rotation signal POS is counted based on the output signal of the reference position sensor, so that the angle position (crank angle) of crankshaft 120 can be detected.

In addition, by counting the number of generations of rotation signal POS from the reference crank angle position to one cam signal PHASE or to the first signal of a plurality of cam signals PHASE output in succession, the rotation phase (a real valve timing of intake valve 105) of intake camshaft 134 with respect to crankshaft 120, which is changed by electric VTC 113, can be detected, and the feedback control can be performed based on the detected value so that the valve timing is brought close to the target value.

In addition, in a case in which internal combustion engine 101 (crankshaft 120) rotates (forward rotation) in the forward direction, the generation of rotation signal POS indicates that crankshaft 120 rotates forward only 10 degrees and the number of generations of rotation signal POS from the reference crank angle position indicates the rotation angle of crankshaft 120 from the reference crank angle position.

However, internal combustion engine 101 (crankshaft 120) may rotate in the reverse direction (reverse rotation) by the compression pressure inside the cylinder just before the stopping of internal combustion engine 101. When the number of generations of rotation signals POS is continuously counted even in the reverse rotation similarly to forward rotation, the incorrect angle position (the crank angle) of crankshaft 120 may be detected.

Figure 4:
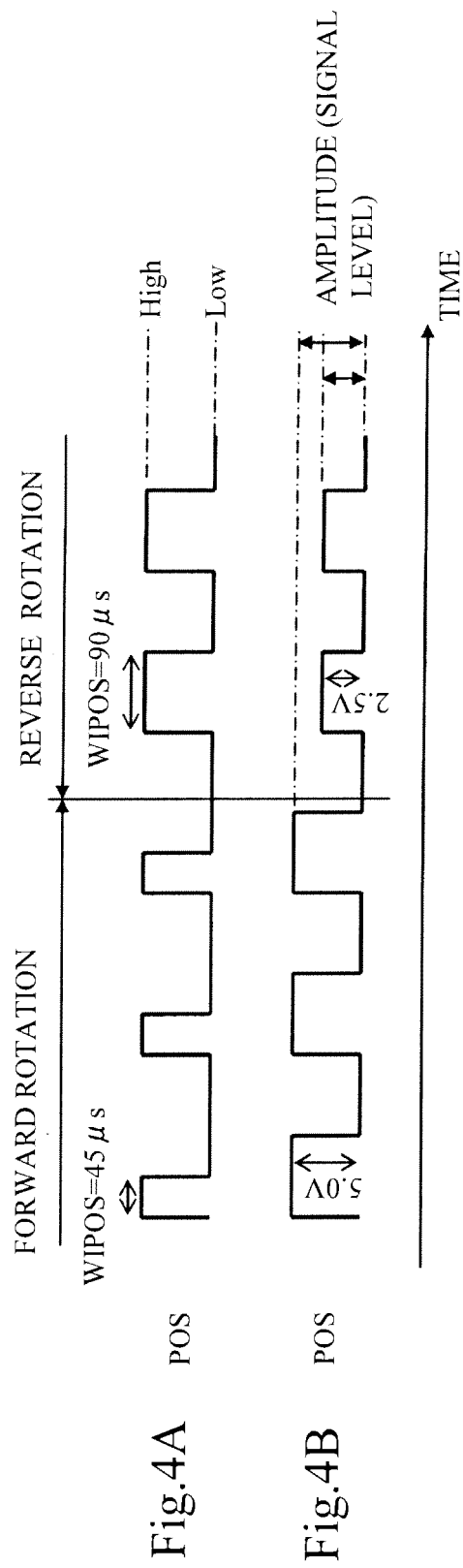
FIG. 4 is a time chart illustrating difference in a pulse width and amplitude according to forward rotation and reverse rotation of a rotation signal in the embodiment.

Therefore, crank angle sensor 117 (rotation detecting device 153) outputs rotation signal POS (pulse signal) which has a different pulse width during forward rotation and reverse rotation of crankshaft 120 so that forward rotation and reverse rotation of internal combustion engine 101 (crankshaft 120) can be determined (see FIG. 4A).

As method of generating the pulse signal having the pulse width varying with the rotation direction of the rotation shaft, the method disclosed in, for example, Japanese Laid-Open Publication No. 2001-165951 is used. Specifically, as the detection pulse signal of projection 151 of signal plate 152, two signals, which have mutually different phases, are generated and the forward rotation and the reverse rotation are determined by comparing these signals. Any one of two pulse signals to be generated to have pulse widths WIPOS different from each other is selected based on the determination result of the rotating direction of the engine, and then, the selected pulse signal is output.

ECU 114 measures pulse width WIPOS of rotation signal POS and compares the measured value WIPOS of the pulse width with a threshold value SL which is a threshold value for determining whether crankshaft 120 is rotated in the forward direction or the reverse direction, to thereby determine whether the pulse width is pulse width WIPOS in the forward rotation or pulse width WIPOS in the reverse rotation. Thus, it is determined whether crankshaft 120 is rotated in the forward direction or the reverse direction.

Threshold value SL used to determine a rotating direction of the engine is set to an intermediate value (for example, 55 µs to 80 µs) between pulse width WIPOS in the forward rotation and pulse width WIPOS in the reverse rotation. In the embodiment in which pulse width WIPOS in the reverse rotation is greater than pulse width WIPOS in the forward rotation, when pulse width WIPOS is equal to or greater than threshold value SL, the reverse rotation state is determined and when pulse width WIPOS is below threshold value SL, the forward rotation state is determined.

In addition, as illustrated in FIG. 4A, in the embodiment, pulse width WIPOS in the forward rotation is set to 45 µs and pulse width WIPOS in the reverse rotation is set to 90 µs; however, pulse width WIPOS is not limited to 45 µs and 90 µs described above. In addition, pulse width WIPOS in the forward rotation may be set to be greater than pulse width WIPOS in the reverse rotation.

In the example illustrated in FIG. 4A, rotation signal POS is a pulse signal which is normally at a low level and changes to a high level only for a fixed time at a predetermined angle position. Rotation signal POS, however, may be a pulse signal which is normally at a high level and changes to a low level only for a fixed time at a predetermined angle position. In this case, the period of the low level may be set to have a different rotation direction, so that the length of the period of the low level is measured as pulse width WIPOS to determine the rotation direction.

In addition, as illustrated in FIG. 4B, amplitude (signal level) of rotation signal POS may be varied according to the forward rotation and the reverse rotation, so that the direction of rotation can be determined based on the difference in the amplitude (the signal level).

In the example illustrated in FIG. 4B, rotation signal POS is a pulse signal which is normally at a low level and changes to a high level only for a fixed time at a predetermined angle. The signal level at the predetermined angle position is set to be higher in the forward rotation than in the reverse rotation when the predetermined angular position is reached. Specifically, the signal level is set to output a 5-V signal in the forward rotation and to output a 2.5-V signal in the reverse rotation.

Figure 5:
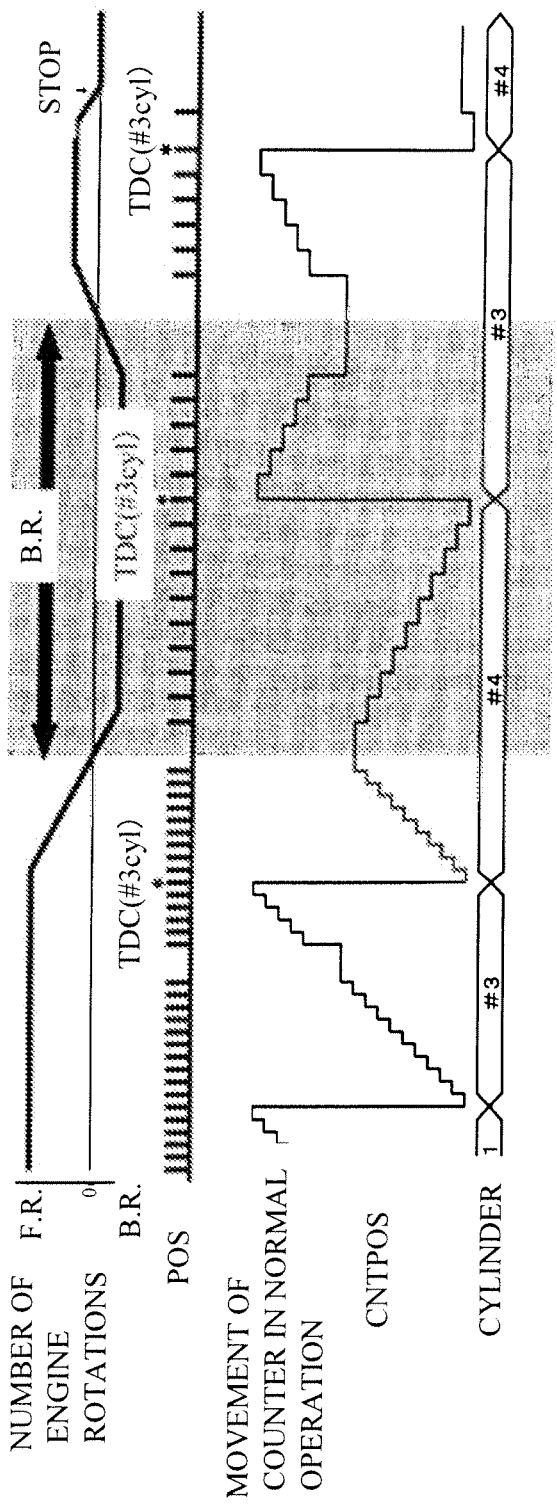
FIG. 5 is a time chart illustrating an increase and decrease change of a counter CNTPOS when reverse rotation is detected in the embodiment.

Thus, as illustrated in FIG. 5, when crankshaft 120 is in the forward rotation, a count value CNTPOS is increased every generation of rotation signal POS, so that the rotation angle to the forward rotation of crankshaft 120 is detected, and when crankshaft 120 is in the reverse rotation, counted value CNTPOS is decreased in response to the generation of rotation signal POS, so that the rotation angle in the forward rotation is decreased by as much as crankshaft 120 is reversed.

In addition, in a case in which top dead center TDC is crossed during the reverse rotation, as illustrated in FIG. 5, the determination result of the cylinder in a predetermined piston position is returned to the previous cylinder in the ignition order, thereby detecting the piston position of each cylinder when the internal combustion engine 101 stops.

In the pattern illustrated in FIG. 5, data of the cylinder at the predetermined piston position is updated in the order of the first cylinder, the third cylinder, the fourth cylinder, the third cylinder, and the fourth cylinder. This indicates a state in which internal combustion engine 101 rotates in the reverse direction after passing top dead center TDC of the third cylinder, and then, returns across top dead center TDC of the third cylinder again. Then, internal combustion engine 101 switches from the reverse rotation to the forward rotation between top dead center TDC of the first cylinder and top dead center of the third cylinder, and stops across top dead center TDC of the third cylinder.

As described above, when whether a rotating direction of the engine is determined and then the crank angle is detected, even though internal combustion engine 101 reversely rotates just before internal combustion engine 101 stops, the crank angle at the time of the stopping of the engine and the piston position of each cylinder at the time of the stopping of the engine can be accurately detected.

Figure 6A:
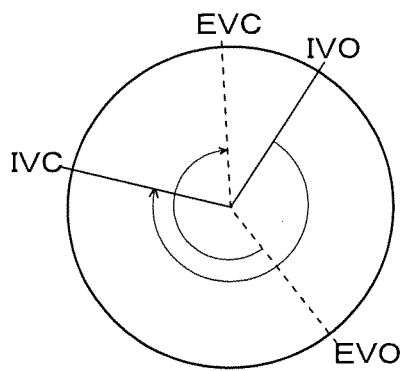
FIGS. 6A and 6B are views illustrating valve timing which is controlled in the embodiment.

Meanwhile, in the internal combustion engine according to the embodiment, as illustrated in FIG. 6A, during normal driving after the starting of the engine, a closing timing of intake valve 105 (IVC) is set to a valve timing which is largely retarded with respect to an intake bottom dead center (BDC), so that a mirror (Atkinson) cycle drive is performed and expansion ratio is increased more than an effective compression ratio of the cylinder. Accordingly, knocking avoiding performance is improved and the mileage can be improved.

Figure 6B:
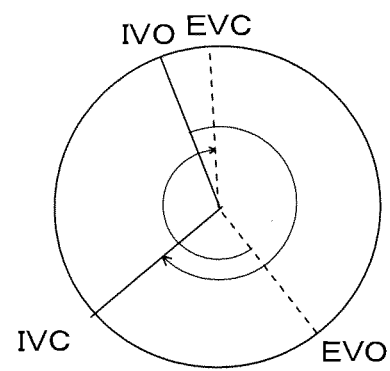

However, during starting, when IVC is excessively retarded (advanced), the intake air amount in the cylinder decreases and then preferable startability is not securable. As illustrated in FIG. 6B, during starting, the valve timing control, in which a retard amount (an advanced amount) of the IVC is decreased to approach the BDC, is performed to increase the intake air amount in the cylinder to thereby secure the startability. Here, in the embodiment, the valve timing after stopping of the engine is controlled to be the valve timing for the engine starting during engine stopping process in which the ignition switch is turned off to stop the engine, in order to achieve the valve timing for the engine starting from the start of cranking.

In this manner, even though the crankshaft rotates in the reverse direction just before stopping of the engine as described above when the valve timing of intake valve 105 is changed by electric VTC 113 during engine stopping process, the crank angle position (the piston position) can be detected with high accuracy.

Meanwhile, in the system in which the number of generations of rotation signal POS is counted and detected until the cam signal (the first cam signal in the cylinder in which a plurality of signals are output) is output from the reference crank angle position described above, the rotation phase (the valve timing of intake valve 105) of intake camshaft 134, which is changed by electric VTC 113, is not able to be correctly detected in the case of reverse rotation because a cam signal to be detected is misdetected.

In addition, since the rotation phase is detected every stroke phase difference between the cylinders, even in the time of the forward rotation, the detection period of the rotation phase is long during extremely low rotation just before stopping of the engine compared to the control period of the feedback control. Therefore, no detected value is updated between the previous control timing and the current control timing, and the rotation phase, which is changed between these timings, is not able to be detected with high accuracy.

Thus, in the embodiment, electric VTC is provided with a motor rotation sensor (an actuator rotation sensor) 201, having a high detection frequency, which can detect the rotation angle (rotation operation amount) of the motor shaft of the driving electric motor (an actuator) including the rotation direction at freely selected timing. Thus, even though the reverse rotation of crankshaft 120 occurs, the rotation phase (the valve timing of intake valve 105) of intake camshaft 134 is detected at a freely selected timing with high accuracy, based on the motor shaft rotation angle signal detected by the motor rotation sensor 201 and rotation signal POS from crank angle sensor 117 having the function for determining whether the engine is rotated in the forward direction or the reverse direction.

As illustrated in FIGS. 7 to 12, electric VTC 113 includes a timing sprocket 1 which is a driving rotation body which is rotated by crankshaft 120 of the internal combustion engine, intake camshaft 134 which is rotatably supported on a cylinder head via a bearing 44 and rotated by a rotational force transmitted from a timing sprocket 1, a cover member 3 which is arranged in a front portion of timing sprocket 1, and then fixed and attached by bolts to chain cover 40 which is a fixing portion, and a phase change mechanism 4 which is a change mechanism arranged between timing sprocket 1 and intake camshaft 134 to change the relative rotation phase of both members 1 and 2 according to a driving state of an engine.

The entire timing sprocket 1 is integrally formed from an iron-based metal and is configured of an annular sprocket main body 1a, the inner peripheral surface of which has a stepped diameter shape, and a gear portion 1b which is integrally provided at an outer periphery of sprocket main body 1a and receives a rotational force from the crankshaft via a timing chain 42 which is wound. In addition, timing sprocket 1 is rotatably supported to intake camshaft 134 by a third ball bearing 43 which is a third bearing provided between a circular groove 1c formed in an inner peripheral side of sprocket main body 1a and an outer periphery of a thick flange portion 2a integrally provided at the front end of intake camshaft 134.

Figure 10:
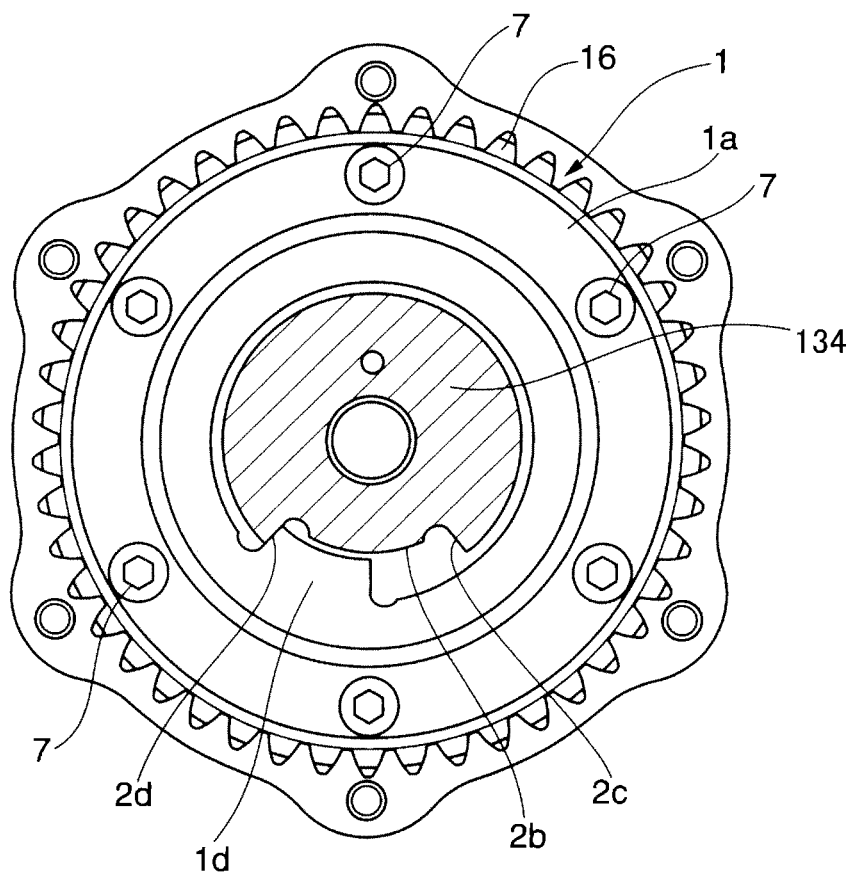
FIG. 10 is a cross-sectional view taken along a line B-B in FIG. 7.

A ring-shaped protrusion 1e is integrally formed at the outer peripheral edge of the front end of sprocket main body 1a. A ring-shaped member 19 and a large diameter annular plate 6 are commonly fastened and fixed by a bolt 7 in the axial direction at the front end of sprocket main body 1a. Ring-shaped member 19 is coaxially positioned in an inner peripheral side of ring-shaped protrusion 1e and internal teeth 19a serving as a wave-shaped mating portion is formed at an inner periphery of ring-shaped member 19. In addition, as illustrated in FIG. 10, a stopper convex portion 1d, which is a circular fastening portion, is formed at a part of the inner peripheral surface of sprocket main body 1a to a range of a predetermined length along a circumferential direction thereof.

A circular housing 5, which is protruded forward, is fixed to the outer periphery of the front end of plate 6 by bolt 11, in a state in which each configuration member (described below) of a reducer 8 or an electric motor 12 of phase change mechanism 4 is covered.

Housing 5 functions as a yoke and is integrally formed from an iron-based metal and integrally has a circular plate-shaped holding portion 5a at the front end side. The entire outer peripheral side including holding portion 5a is arranged with a covered shape having a predetermined gap by cover member 3.

Intake camshaft 134 has two drive cams per cylinder which operates to open intake valve 105 at the outer periphery. A driven member 9, which is a driven rotation body, is coupled by a cam bolt 10 to the front end from the axial direction. In addition, as illustrated in FIG. 10, a stopper concave groove 2b, which is a locking portion into which stopper convex portion 1d of sprocket main body 1a is inserted, is formed at flange portion 2a of intake camshaft 134 along the circumferential direction. Stopper concave groove 2b is formed in a circular shape having a predetermined length in the circumferential direction, and edges of both ends of stopper convex portion 1d, which rotates over the range of the length, come in contact with opposite edges 2c and 2d in the circumferential direction respectively. Thus, the relative rotational position of the maximum advanced angle side or the maximum retard angle side of intake camshaft 134 to timing sprocket 1 is regulated.

Cam bolt 10 is integrally formed with a flange-shaped bearing surface 10c at an end edge of a head portion 10a at the side of a shaft portion 10b. A male screw portion, which screws a female screw portion formed in the internal axial direction from the end portion of intake camshaft 134, is formed at the outer periphery of the shaft portion 10b.

Figure 8:
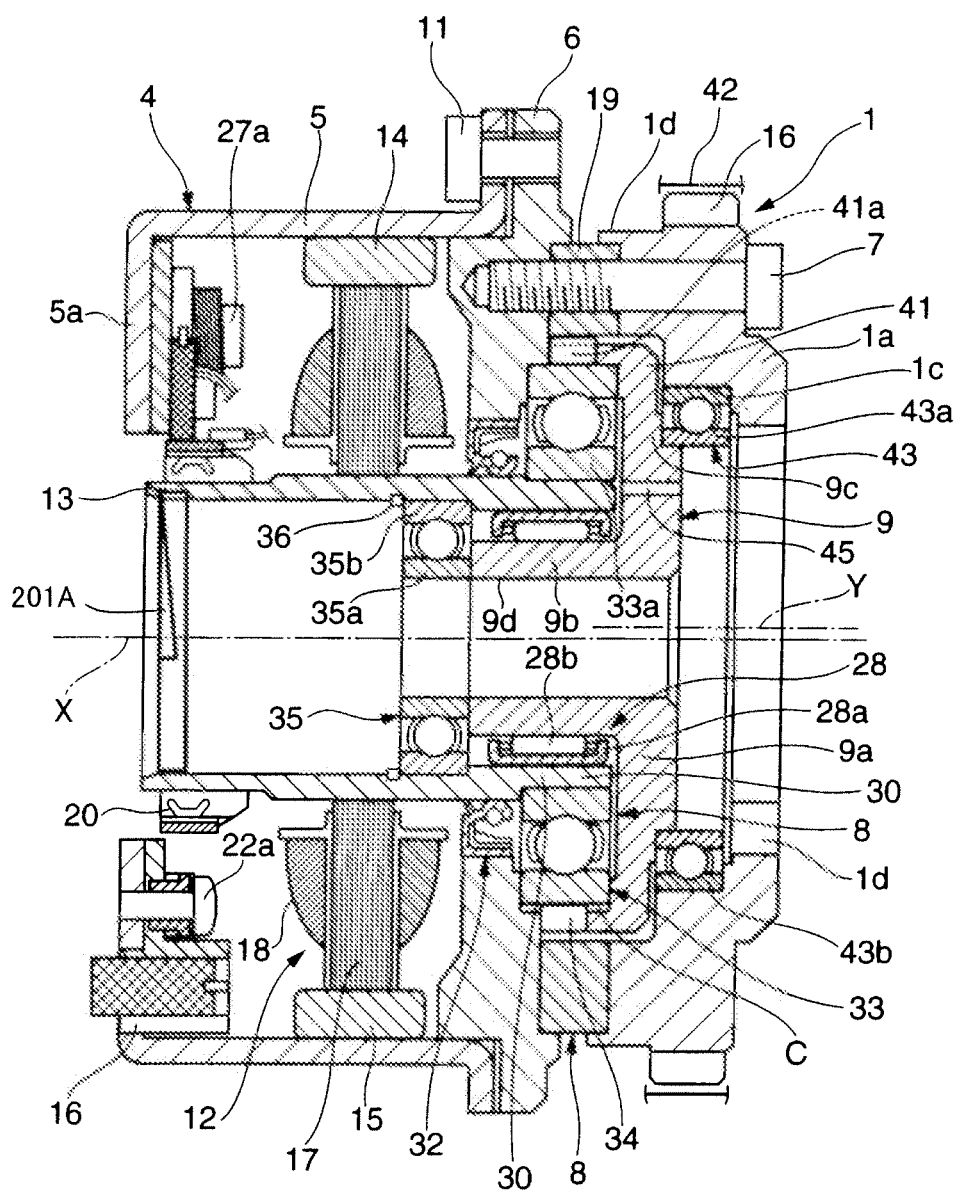
FIG. 8 is an enlarged cross-sectional view illustrating a main portion of main components in the variable valve timing mechanism.
Figure 9:
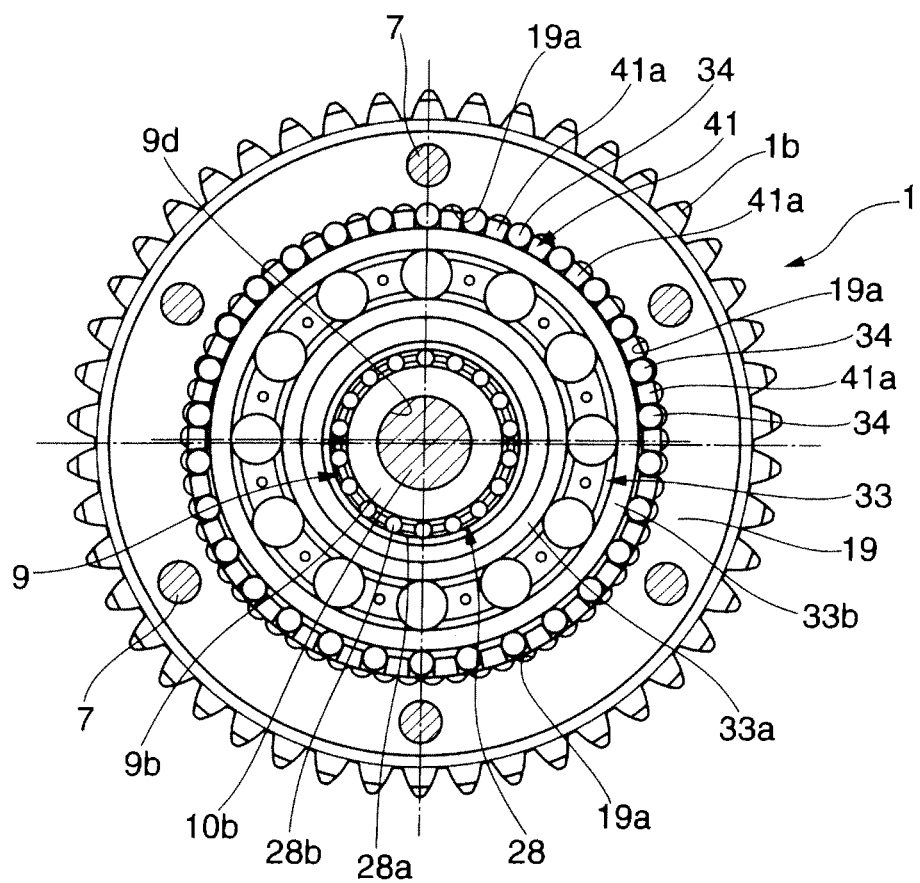
FIG. 9 is a cross-sectional view taken along a line A-A in FIG. 7.

Driven member 9 is integrally formed with the iron-based metal and as illustrated in FIG. 8, is configured of a disk portion 9a formed at the front end side and a cylindrical barrel portion 9b integrally formed at the rear end side.

Disk portion 9a is integrally configured such that a ring-shaped step protrusion 9c having substantially the same outer diameter as flange portion 2a of intake camshaft 134 at a substantially center position in the radial direction of the rear end surface and the outer periphery surface of step protrusion 9c and the outer periphery surface of flange portion 2a are inserted and arranged at the inner periphery of an inner ring 43a of third ball bearing 43. An outer ring 43b of third ball bearing 43 is pressed and fixed to the inner peripheral surface of circular groove 1c of sprocket main body 1a.

In addition, as illustrated in FIGS. 7 to 11, a holder 41, which holds a plurality of rollers 34 (described below), is integrally provided at the outer periphery portion of disk portion 9a. Holder 41 is formed to protrude from the outer periphery portion of disk portion 9a in the same direction as barrel portion 9b and is formed by a plurality of long narrow protrusions 41a having a predetermined gap at the positions at substantially regular intervals in the circumferential direction.

Figure 7:
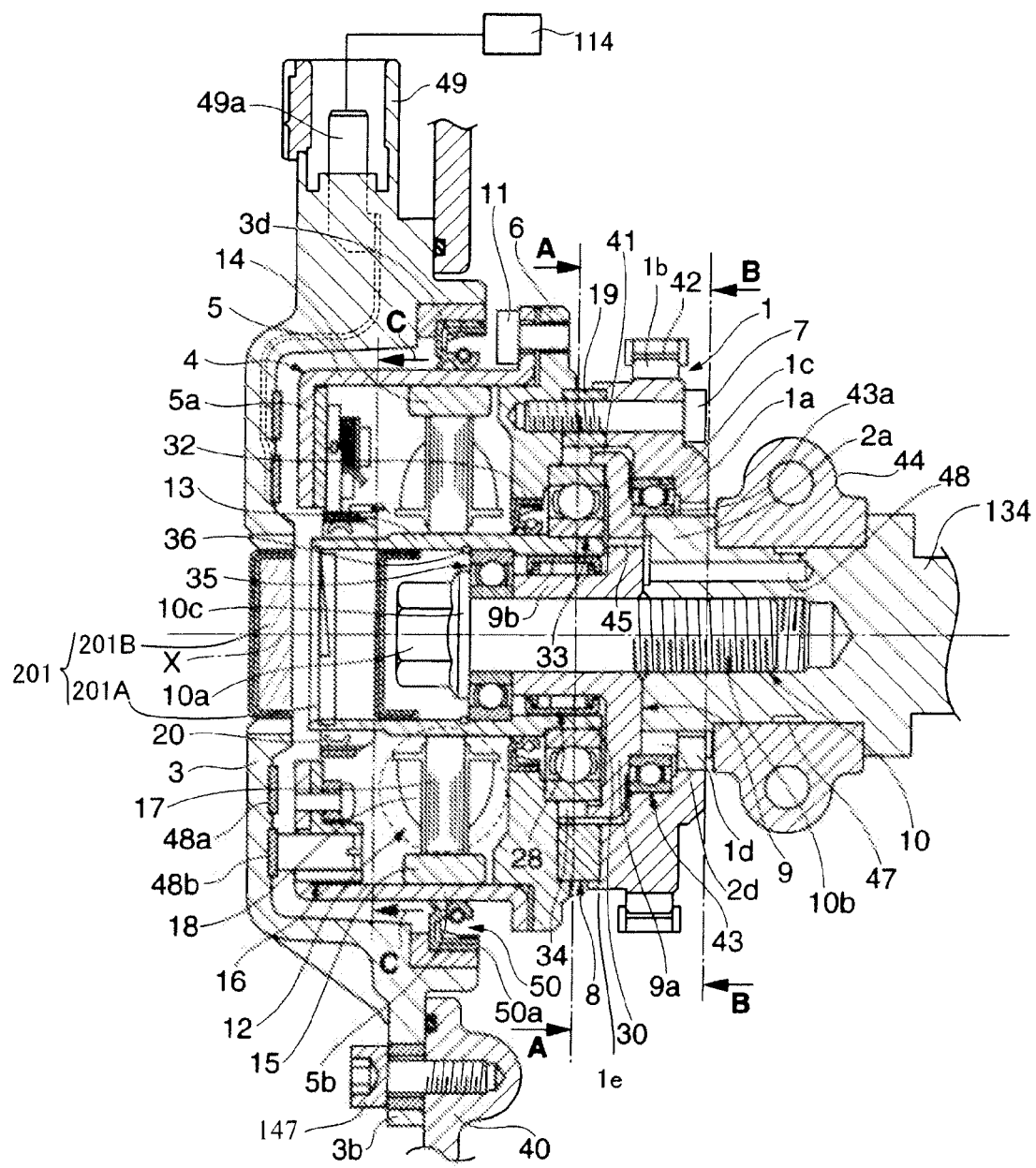
FIG. 7 is a vertical cross-sectional view illustrating a variable valve timing mechanism in the embodiment.

As illustrated in FIG. 7, barrel portion 9b is configured such that an insertion hole 9d, into which shaft portion 10b of cam bolt 10 is inserted, is formed by penetration at the center position and a first needle bearing 30 (described below), which is a first bearing, is provided at the outer peripheral side.

Figure 11:
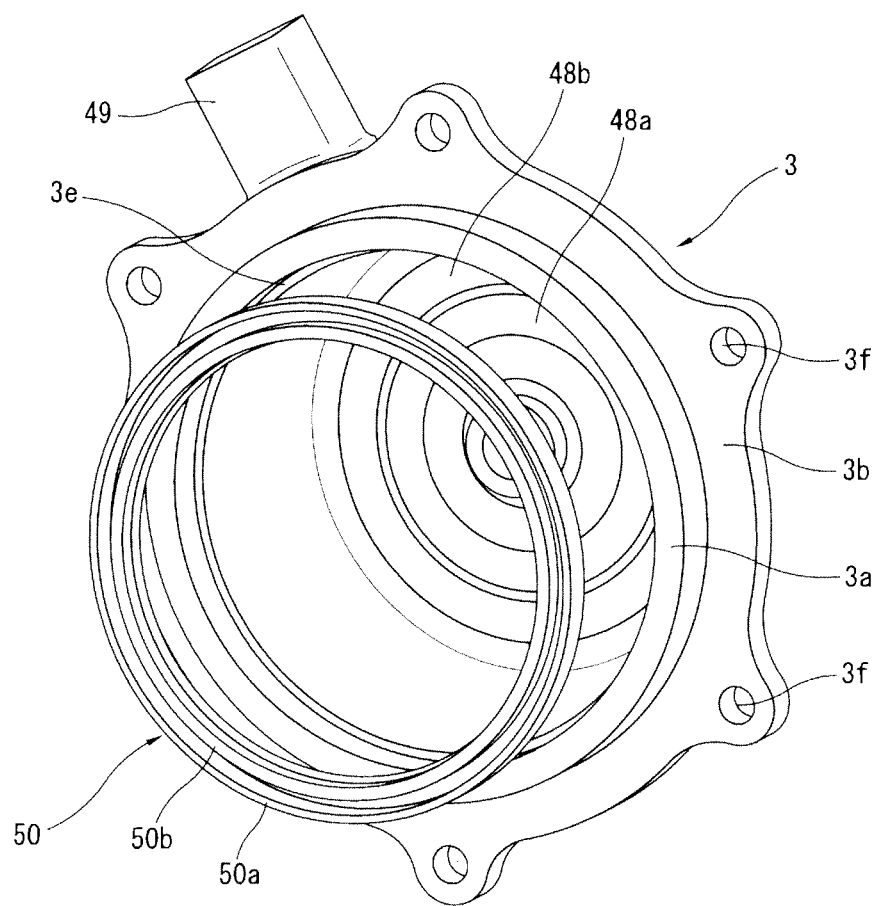
FIG. 11 is an exploded perspective view illustrating a cover member and a first oil seal provided in the variable valve timing mechanism.

As illustrated in FIGS. 7 and 11, cover member 3 is integrally formed from a relatively thick synthetic resin material, and is configured of a cover main body 3a bulged out in a cup shape and a bracket 3b integrally having cover main body 3a at the outer periphery of the rear end portion.

Cover main body 3a is arranged to cover the front end side of phase change mechanism 4, in other words, to cover substantially the entire rear end portion from a holder 5b of housing 5 in the axial direction with a predetermined gap. Meanwhile, bolt insertion holes 3f are each formed by penetration in six boss portions formed in substantially ring shape at bracket 3b.

In addition, as illustrated in FIG. 7, cover member 3 is configured such that bracket 3b is fixed to chain cover 40 via a plurality of bolts 147, and inside and outside slip rings 48a, 48b are embedded and fixed at the inner peripheral surface of front end portion 3c of cover main body 3a in a state in which each inner end surface is exposed. At an upper end portion of cover member 3, a connector portion 49 is provided. At the inside thereof, a connector terminal 49a which is connected to slip rings 48a and 48b via a conductive member is fixed. In addition, connector terminal 49a is connected or disconnected from a battery power supply (not shown) via a control unit 21.

Thus, as illustrated in FIG. 7, a first oil seal 50 having a large diameter, which is a seal member, is interposed between the inner peripheral surface at the rear end portion side of cover main body 3a and the outer periphery surface of housing 5. First oil seal 50 is formed in a substantially U shape in cross-section thereof and a core bar is embedded inside a substrate of a synthetic rubber. A ring-shaped base portion 50a at the outer peripheral side is fitted and fixed inside circular groove 3d formed in the inner peripheral surface of the rear end portion of cover member 3a. In addition, a seal surface 50b, which abuts against the outer periphery surface of housing 5, is integrally formed at the inner peripheral side of ring-shaped base portion 50a.

Phase change mechanism 4 is configured of electric motor 12 which is arranged at the front end side substantially coaxial with intake camshaft 134 and reducer 8 which reduces the rotation speed of electric motor 12 and transmits the rotation of the speed to intake camshaft 134.

As illustrated in FIGS. 7 and 8, electric motor 12 is a brushed DC motor and includes housing 5 which is a yoke integrally rotating with timing sprocket 1, a motor shaft 13 which is an output shaft rotatably provided inside housing 5, a pair of semicircular permanent magnets 14 and 15 which are fixed at the inner peripheral surface of housing 5, and a stator 16 which is fixed to an inner bottom surface of holding portion 5a of the housing.

Motor shaft 13 is formed in a cylindrical shape and functions as an armature. An iron core rotor 17 having a plurality of poles is fixed at the outer periphery of the substantially center position of motor shaft 13 in the axial direction and an electromagnetic coil 18 is wound around the outer periphery of iron core rotor 17. In addition, a commutator 20 is pressed and fixed at the outer periphery of the front end portion of motor shaft 13. Electromagnetic coil 18 is connected to each segment divided into the same number as the number of the poles of iron core rotor 17a at commutator 20.

Figure 12:
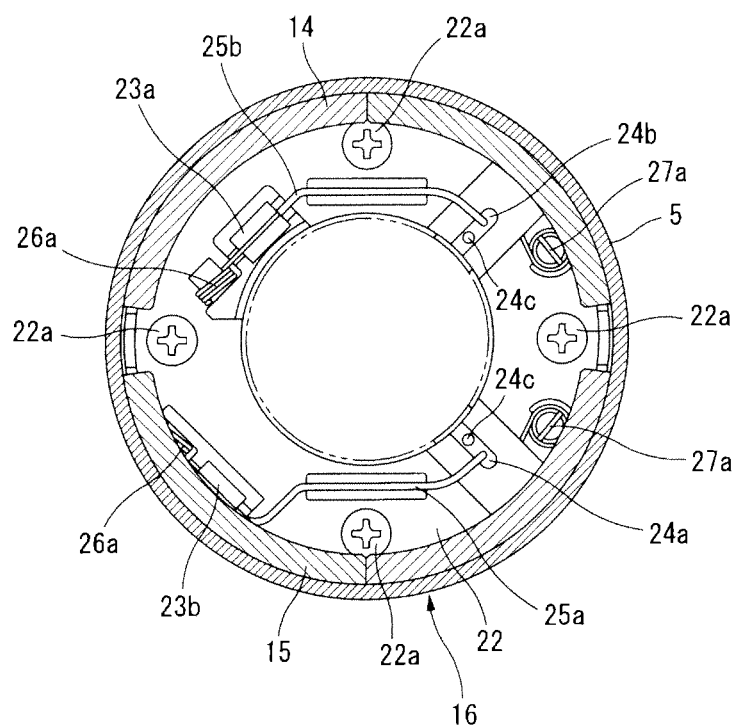
FIG. 12 is a cross-sectional view taken along a line C-C in FIG. 7.

As illustrated in FIG. 12, stator 16 is mainly configured of a disk-shaped resin holder 22 which is fixed by four screws 22a at an inner bottom wall of holding portion 5a, two inside and outside first brushes 23a and 23b in the circumferential direction which are arranged to penetrate resin holder 22 and holding portion 5a in the axial direction, and second brushes 24a and 24b which are retractably held inward at the inner peripheral side of resin holder 22. Each front end surface of first brushes 23a and 23b comes into sliding contact with a pair of slip rings 48a and 48b so as to be fed with the power supply. Circular front end portions of second brushes 24a and 24b come into sliding contact with the outer periphery surface of the commutator 20.

First brushes 23a and 23b and second brushes 24a and 24b are connected by pig tail harnesses 25a and 25b, and biased in the direction of slip rings 48a and 48b or in the direction of commutator 20 by a spring force of twist springs 26a and 27a elastically connected respectively.

Motor shaft 13 is rotatably supported to the outer periphery surface of shaft portion 10b of head portion 10a side of cam bolt 10 via a needle bearing 28 which is the first bearing and a fourth ball bearing 35 which is a bearing arranged at the side portion in the axial direction of needle bearing 28. In addition, a cylindrical eccentric shaft portion 30, which constitutes a part of reducer 8, is integrally provided at the rear end portion of intake camshaft 134 side of motor shaft 13.

First needle bearing 28 is configured of a cylindrical retainer 28a which is pressed in the inner peripheral surface of eccentric shaft portion 30, and needle rollers 28b which are a plurality of rolling bodies rotatably held inside retainer 28a. Needle rollers 28b roll the outer periphery surface of barrel portion 9b of driven member 9.

Fourth ball bearing 35 is configured such that inner ring 35a is fixed in a pinched state between the front end edge of barrel portion 9b of driven member 9 and seat surface portion 10c of cam bolt 10, meanwhile, outer ring 35b is supported to be positioned in the axial direction between a step portion which is formed at the inner periphery of motor shaft 13 and a snap ring 36 which is an anti-slip ring.

In addition, a second oil seal 32, which is a friction member preventing lubricant from leaking from the inside of reducer 8 into electric motor 12, is provided between the outer periphery surface of motor shaft 13 (eccentric shaft portion 30) and the inner peripheral surface of plate 6. The inner peripheral surface of second oil seal 32 elastically contacts the outer periphery surface of motor shaft 13 so that second oil seal 32 provides frictional resistance against the rotation of motor shaft 13.

As illustrated in FIGS. 7 and 8, reducer 8 is mainly configured of eccentric shaft portion 30 which performs an eccentric rotation movement, a second ball bearing 33 which is a second bearing provided at the outer periphery of eccentric shaft portion 30, roller 34 which is provided at the outer periphery of second ball bearing 33, holder 41 which allows moving of roller 34 in the radial direction while holding roller 34 in the rolling direction, and driven member 9 which is integrally formed with holder 41.

Eccentric shaft portion 30 is configured such that a shaft center Y of the cam surface formed at the outer periphery surface is slightly deviated from a shaft center X of motor shaft 13 in the radial direction. In addition, second ball bearing 33, roller 34 and the like are configured as a planetary mating portion.

Second ball bearing 33 is formed in a large diameter shape and the entire second ball bearing 33 is arranged at a position in the radial direction of first needle bearing 28 in an overlapped state. Inner ring 33a is pressed and fixed at the outer periphery surface of eccentric shaft portion 30 and roller 34 constantly abuts the outer periphery surface of outer ring 33b. In addition, circular gap C is formed at the outer peripheral side of outer ring 33b and thereby the entire second ball bearing 33 is able to move in the radial direction, in other words, is able to eccentrically move according to the eccentric rotation of eccentric shaft portion 30 by gap C.

Each roller 34 engages with internal teeth 19a of ring-shaped member 19 while moving in the radial direction according to the eccentric movement of second ball bearing 33 and is configured to swing in the radial direction while being guided in the circumferential direction by protrusion 41a of holder 41.

Lubricant is supplied by lubricant supply means inside reducer 8. As illustrated in FIG. 7, lubricant supply means is configured of a lubricant supply passage 47 which is formed inside bearing 44 of cylinder head and through which the lubricant is supplied from a main lubricant gallery (not shown), a lubricant supply hole 48 which is formed inside intake camshaft 134 in the axial direction and communicates with lubricant supply passage 47 via a groove, an oil supply hole 45, which is formed to penetrate driven member 9 inside thereof in an axial direction, and has a small diameter, of which an end is opened to lubricant supply hole 48 and the other end is opened to near second ball bearing 33 and first needle bearing 28, and three large-diameter oil discharge holes (not shown), which are formed to penetrate the driven member 9 in the same manner.

Hereinafter, operation of electric VTC 113 is described. When the crankshaft of the engine rotates, timing sprocket 1 rotates via timing chain 42. Electric motor 12 is synchronously rotated by the rotational force via housing 5, ring-shaped member 19 and plate 6. Meanwhile, the rotational force of ring-shaped member 19 is transmitted from roller 34 to intake camshaft 134 via holder 41 and driven member 9. Accordingly, the cam of intake camshaft 134 opens and closes the intake valve.

Thus, when electric VTC 113 is driven and then the rotation phase (valve timing of intake valve 105) of intake camshaft 134 is changed, electromagnetic coil 17 of electric motor 12 is conducted from control unit 21 via slip rings 48a and 48b or the like. Thereby, motor shaft 13 is driven to rotate and the rotational force which is reduced is transmitted to intake camshaft 134 via reducer 8.

In other words, when eccentric shaft portion 30 is eccentrically rotated due to the rotation of motor shaft 13, each roller 34 is guided by protrusion 41a of holder 41 in the radial direction for each rotation of motor shaft 13. Each roller 34 moves through one internal tooth 19a of ring-shaped member 19, thereby moves while rolling to another adjacent internal tooth 19a and rolling in the circumferential direction while this is sequentially repeated. The rotational force is transmitted to driven member 9 while reducing the rotation speed of motor shaft 13 through the rolling contact of each roller 34. At this time, a reduction ratio is able to be freely set by the number of rollers 34 or the like.

Accordingly, intake camshaft 134 relatively normally and reversely rotates with respect to timing sprocket 1 and thereby the relative rotational position is changed. Thus, the opening and closing timing of the intake valve is controlled to change to the advanced angle side or the retard angle side.

Thus, the maximum position regulation (angle position regulation) of the normal and reverse relative rotation of intake camshaft 134 with respect to timing sprocket 1 is performed through the abutting of each side surface of stopper convex portion 1d to any one of each opposite surface 2c and 2d of stopper convex groove 2b.

In other words, driven member 9 rotates in the same direction as the rotation direction of timing sprocket 1 according to the eccentric rotation of eccentric shaft portion 30. Thereby, one side surface of stopper convex portion 1d abuts on opposite surface 1c of one side of stopper concave groove 2b so that further rotation in the same direction is regulated. Thus, intake camshaft 134 is configured such that the relative rotational phase with respect to timing sprocket 1 is maximally changed to the advanced angle side.

Meanwhile, driven member 9 rotates in the direction reverse to the rotation direction of timing sprocket 1 and thereby the other side surface of stopper convex portion 1d abuts opposite surface 2d of the other side of stopper concave groove 2b and the further rotation in the same direction is regulated. Thus, intake camshaft 134 is configured such that the relative rotational position with respect to timing sprocket 1 is maximally changed to the retard angle side.

Figure 13:
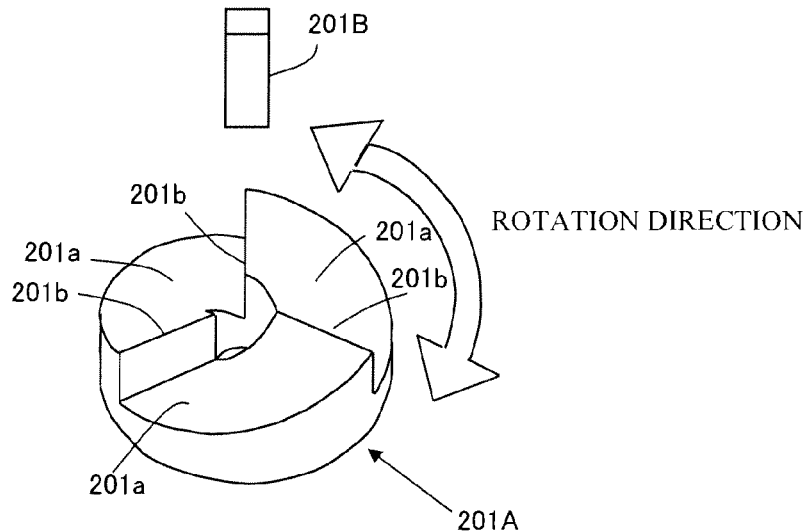
FIG. 13 is a perspective view illustrating a configuration of a motor rotation sensor used in the embodiment.

In addition, as illustrated in FIG. 13, motor rotation sensor 201 is composed of a detected portion 201A and a rotation angle detection portion 201B that is a gap sensor detecting displacement of the detected portion 201A in the rotation direction.

As illustrated in FIGS. 7 and 8, the detected portion 201A is inserted through and fixed to a front end edge of motor shaft 13, and as illustrated in FIG. 7, rotation angle detection portion 201B is inserted through and fixed to a hole formed by penetrating a portion opposite to the front side of detected portion 201A of cover member 3.

As illustrated in FIG. 13, detected portion 201A is formed in a three-dimensional shape and three target portions protruding in the axial direction are formed at equally spaced positions in the circumferential direction. Each of the target portions is composed of an inclined portion 201a having end surfaces opposite to rotation angle detection portion 201B that are formed in an arc shape in the circumferential direction, respectively, and an edge portion 201b which is linearly raised from the end edge of inclined portion 201a in the axial direction and the radial direction.

Each inclined portion 201a is formed in a downward slope from one end side in which edge portion 201b is the top point to the other end side at a predetermined angle in a clockwise direction. The detection position detected by rotation angle detection portion 201B continuously changes. Meanwhile, each edge portion 201b is raised along the radial direction and thereby is formed from one end of inclined portion 201a in a planar surface shape in the axial direction. Accordingly, the detection position discontinuously changes.

Figure 14A:
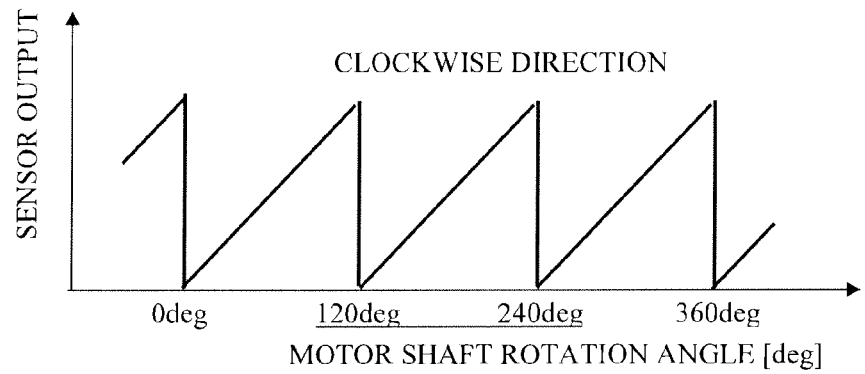
FIG. 14A is a wave diagram illustrating a signal output from the motor rotation sensor when the motor rotates in a clockwise direction and FIG. 14B is a wave diagram illustrating a signal output from the motor rotation sensor when the motor rotates in a counterclockwise direction.
Figure 14B:
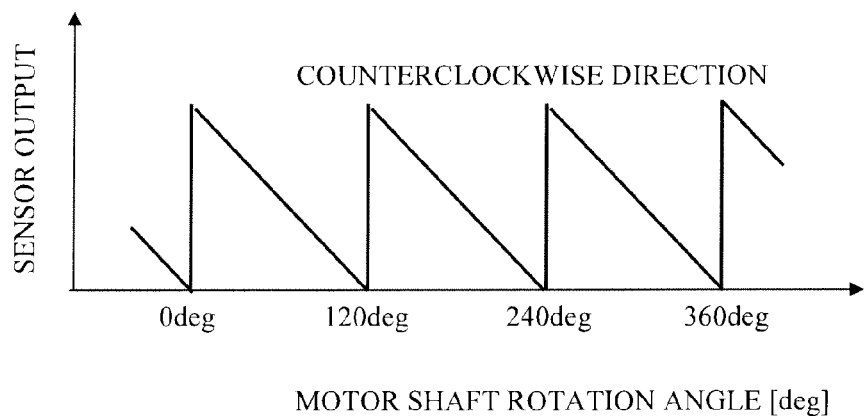

Rotation angle detection portion 201B is the electromagnetic pickup type and detects inclined portion 201a and edge portion 201b of detected portion 201A facing each other. Thereby, as shown in FIG. 14, rotation angle detection portion 201B outputs a continuous wave signal of a step shape (a saw blade). In other words, when motor shaft 13 rotates in a clockwise direction, the output gradually increases during detecting inclined portion 201a and the output becomes a wave signal which is steeply fallen during detecting edge portion 201b. When motor shaft 13 rotates in a counterclockwise direction, the output gradually decreases during detecting inclined portion 201a and the output becomes a wave signal which is steeply raised during detecting edge portion 201b.

Using the characteristics, when the output gradually increases, the rotation angle of motor shaft 13 in a clockwise direction (for example, the advanced angle direction) is gradually increased according to the gradual increase of the output, and when the output gradually decreases, the rotation angle of motor shaft 13 in a counterclockwise direction (for example, the retard angle direction) is gradually increased according to the gradual decrease of the output. Thereby, the rotation angle (the rotation operation amount) with the rotation direction can be continuously (linearly) detected. In addition, when detecting edge portion 201b, an output value (an output voltage) of the corresponding rotation angle is learned, and thereby detection error can be suppressed.

Thus, as described above, based on the rotation angle detection signal of the motor shaft from motor rotation sensor 201 having the characteristics described above and rotation signal POS from crank angle sensor 117, during engine stopping process, the rotation phase of intake camshaft 134, in other words, the valve timing of intake valve 105 is detected with high accuracy and the advanced angle is controlled from the valve timing corresponding to the mirror cycle operation before the stop operation to the valve timing for the starting.

Hereinafter, each of embodiments of the valve timing control of intake valve 105 is described.

Figure 15:
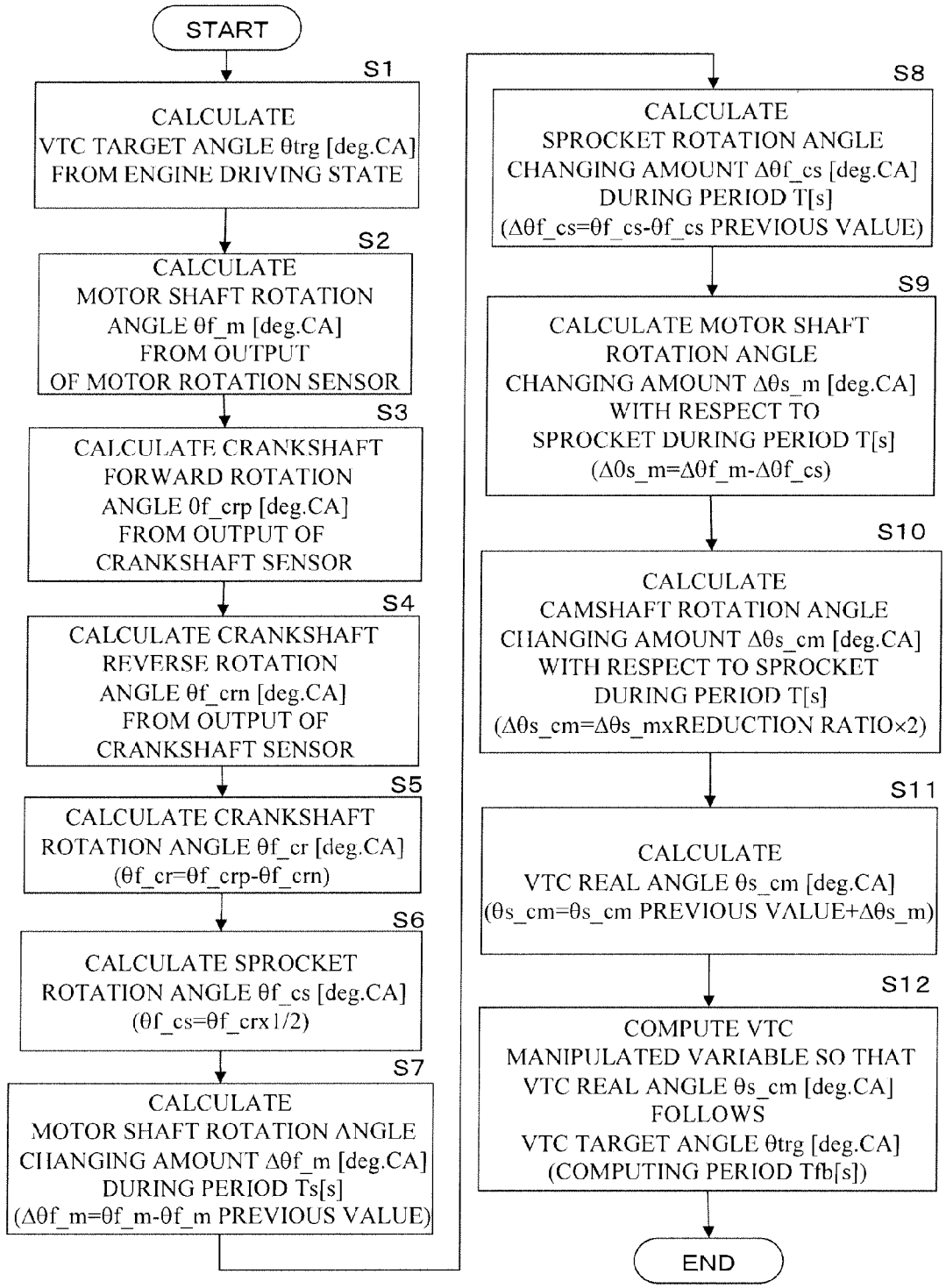
FIG. 15 is a flowchart of a first embodiment of valve timing control of an intake valve by the variable valve timing mechanism.

FIG. 15 illustrates a flow of the first embodiment. In the embodiment, cam signal PHASE is used to determine the cylinder and the valve timing is detected using the detection signal of crank angle sensor 117 and motor rotation sensor 201.

In Step 1, based on the driving states of the internal combustion engine (the engine), the VTC target angle θtrg [deg.CA], in other words, the target rotation phase (the target valve timing of intake valve 105) of intake camshaft 134 controlled by electric VTC 113 is calculated. Here, VTC target angle θtrg [deg.CA] is set to the target valve timing for mirror operation illustrated in FIG. 6A during the mirror cycle operation, however, when the ignition switch is OFF and then the engine driving is stopped, VTC target angle θtrg [deg.CA] is changed and set to the target valve timing for starting illustrated in FIG. 6B.

In Step 2, the motor shaft rotation angle θf_m [deg.CA] is calculated by the output of motor rotation sensor 201. Here, in the embodiment, the electric motor main body integrally rotates with timing sprocket 1 so that motor shaft rotation angle θf_m [deg.CA] is calculated as the rotation angle obtained by adding the driving rotation angle of motor shaft 13 with respect to the electric motor main body to the rotation angle of timing sprocket 1.

In Step 3, the rotation angle (the crankshaft forward rotation angle) θf_crp [deg.CA] of crankshaft 120 in the forward direction is calculated by the output of crank angle sensor 117. In the embodiment, the crankshaft forward rotation angle θf_crp [deg.CA] is calculated by counting rotation signal POS which is output every 10 deg from the reference position (the compression TDC) of each cylinder as described above.

In Step 4, similarly, rotation angle (the crankshaft reverse rotation angle) θf_crn [deg.CA] of crankshaft 120 in the reverse direction is calculated by the output of crank angle sensor 117. The crankshaft reverse rotation angle θf_crp [deg.CA] is calculated by counting rotation signal POS which is output after the reverse rotation is determined as described above. If the reverse rotation does not occur, θf_crn [deg.CA] =0.

In Step 5, rotation angle θf_cr [deg.CA] of the crankshaft, which is finally detected including whether the reverse rotation is present, is calculated by the following expression.

$$\theta f\_cr = \theta f\_crp - \theta f\_crn$$

In Step 6, rotation angle θf_cs [deg.CA] of timing sprocket 1 is calculated by the following expression.

$$\theta f\_cs = \theta f\_cr \times 1/2$$

Here, the rotation speed of timing sprocket 1 is decreased to ½ of rotation speed θf_cr of the crankshaft and thereby the rotation speed is calculated by being multiplied by the reduction ratio 1/2.

In Step 7, a rotation angle changing amount Δθf_m [deg.CA] of the motor shaft during the control period (from the previous control timing to the current control timing) Ts [s] is calculated.

$$\Delta\theta f\_m = \theta f\_m - \theta f\_m \text{ previous value}$$

In Step 8, the rotation angle changing amount Δθf_cs [deg.CA] of the sprocket during control period Ts [s] is calculated.

$$\Delta\theta f\_cs = \theta f\_cs - \theta f\_cs \text{ previous value}$$

In Step 9, the rotation angle changing amount (the changing amount of the driving rotation angle) Δθs_m [deg.CA] of the motor shaft with respect to timing sprocket 1 during control period Ts [s] is calculated.

$$\Delta\theta s\_m = \Delta\theta f\_m - \Delta\theta f\_cs$$

In Step 10, the crank angle conversion value Δθs_cm [deg.CA] of the rotation angle changing amount (the changing amount of the camshaft rotation angle) of the intake camshaft with respect to timing sprocket 1 during the control period Ts [s] is calculated.

$$\Delta\theta s\_cm = \Delta\theta f\_m \times \text{reduction ratio} \times 2$$

Here, the reduction ratio is a reduction ratio (for example, 1/60) of the rotation speed of the camshaft which is reduced by reducer 8 described above with respect to the rotation speed of the motor. In addition, the value is further multiplied by a conversion coefficient 2 to the crank angle [deg.CA].

In Step 11, a current real rotation angle (a VTC real angle) θs_cm [deg.CA] of intake camshaft 134, in other words, the rotation phase (the valve timing of intake valve 105) of intake camshaft 134 is calculated by the following expression.

$$\theta s\_cm = \theta s\_cm \text{ previous value} + \Delta\theta s\_cm$$

In Step 12, VTC manipulated variable is computed so that VTC real angle θs_cm [deg.CA] follows VTC target angle θtrg [deg.CA].

Accordingly, electric VTC 113 is driven by electric motor 12 according to the VTC manipulated variable. The valve timing of intake valve 105 is controlled to the valve timing for the mirror operation at which the IVC is sufficiently retarded, during the mirror cycle operation, and the valve timing is controlled to the valve timing at which the IVC is advanced for the starting after stop, during engine stopping process.

Figure 21:
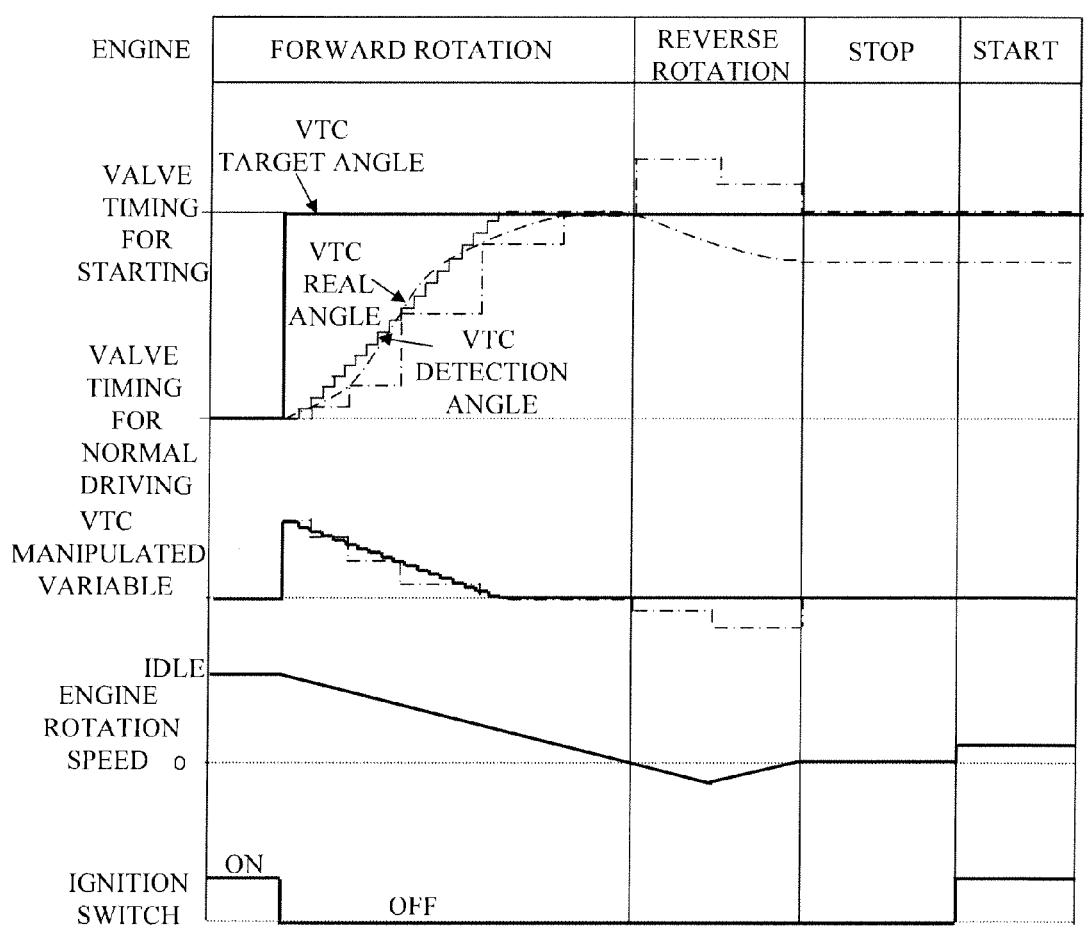
FIG. 21 is a time chart illustrating change of various states in valve timing control of an intake valve during engine stopping process in each of the embodiments.

According to the first embodiment described above, as indicated by a solid line in FIG. 21, even though the phenomenon in which the crankshaft is reversed during engine stopping process or the like occurs, the rotation phase of intake camshaft 134 can be detected with high accuracy at a freely selected timing using the rotation angle of the motor shaft which is detected by motor rotation sensor 201 with high frequency while the reverse rotation is detected by crank angle sensor 117. Furthermore, based on the rotation phase of intake camshaft 134 detected with high accuracy in this manner, it is possible to perform feedback control to control the valve timing of intake valve 105 after the engine is stopped to the advanced valve timing for the starting with high accuracy. After that, the sufficient intake air amount is obtained during the starting and thereby favorable startability can be secured. In addition, as indicated by the dotted line in FIG. 21, in a case in which the control is performed based on only the rotation phase of the intake camshaft detected using the cam signal, since the frequency of the detections is low, the detection is not performed with high accuracy and the control of the valve timing cannot be performed with high accuracy. In addition, in a case in which the crankshaft rotates in the reverse direction, the reverse rotation is misdetected and thereby the valve timing cannot be correctly controlled.

In addition, even during extremely low rotation such as during starting (the cranking), the high-accuracy control of the valve timing can be maintained based on the very accurate detected value of the valve timing using the rotation angle of the motor shaft. In addition, even during starting, the reverse rotation may rarely occur. Even in this case, however, the valve timing is correctly detected and thereby the valve timing can be maintained at the valve timing for the starting.

Figure 16:
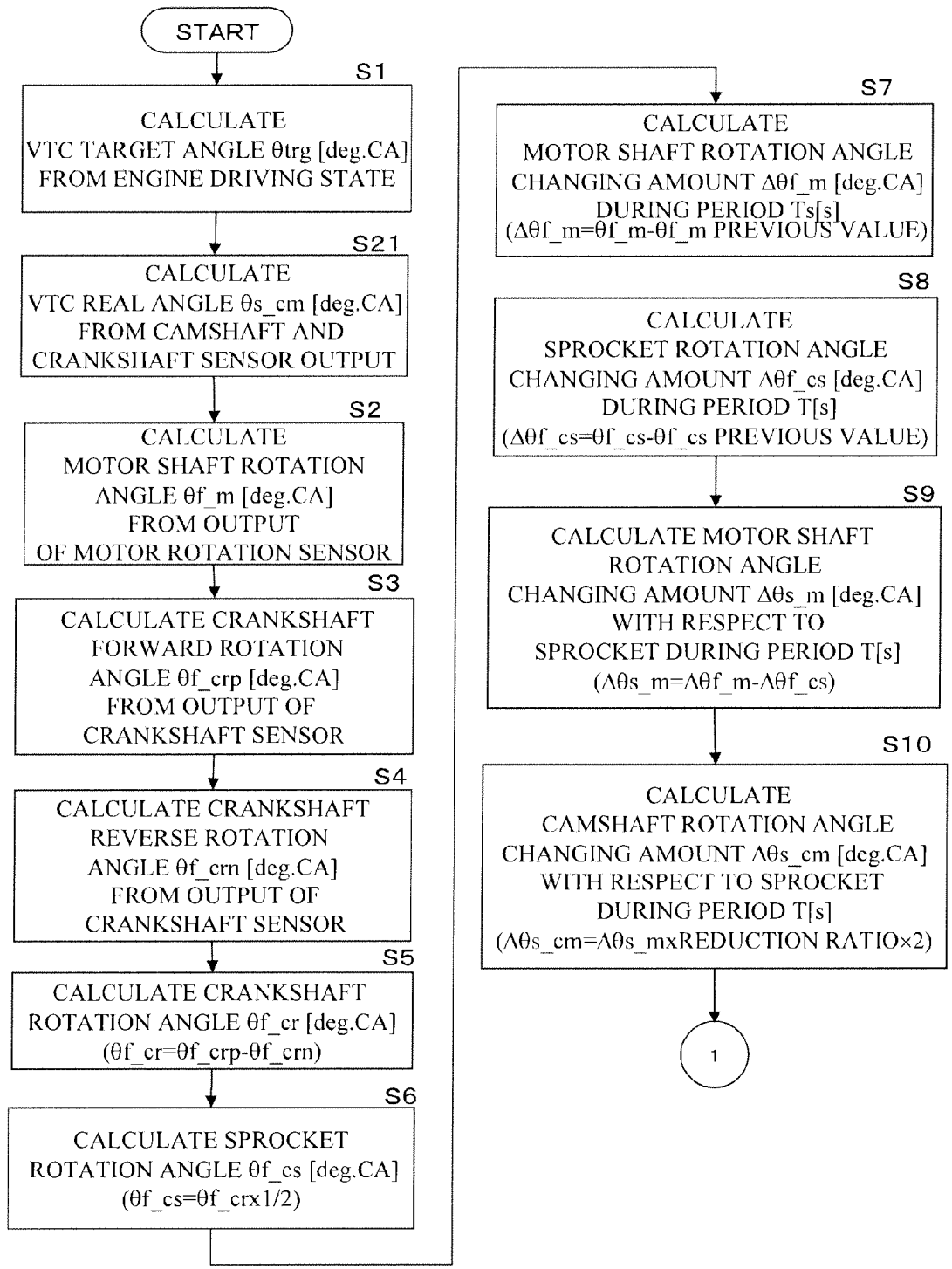
FIG. 16 is a view illustrating a first half of a flowchart of a second embodiment of valve timing control of an intake valve by the variable valve timing mechanism.
Figure 17:
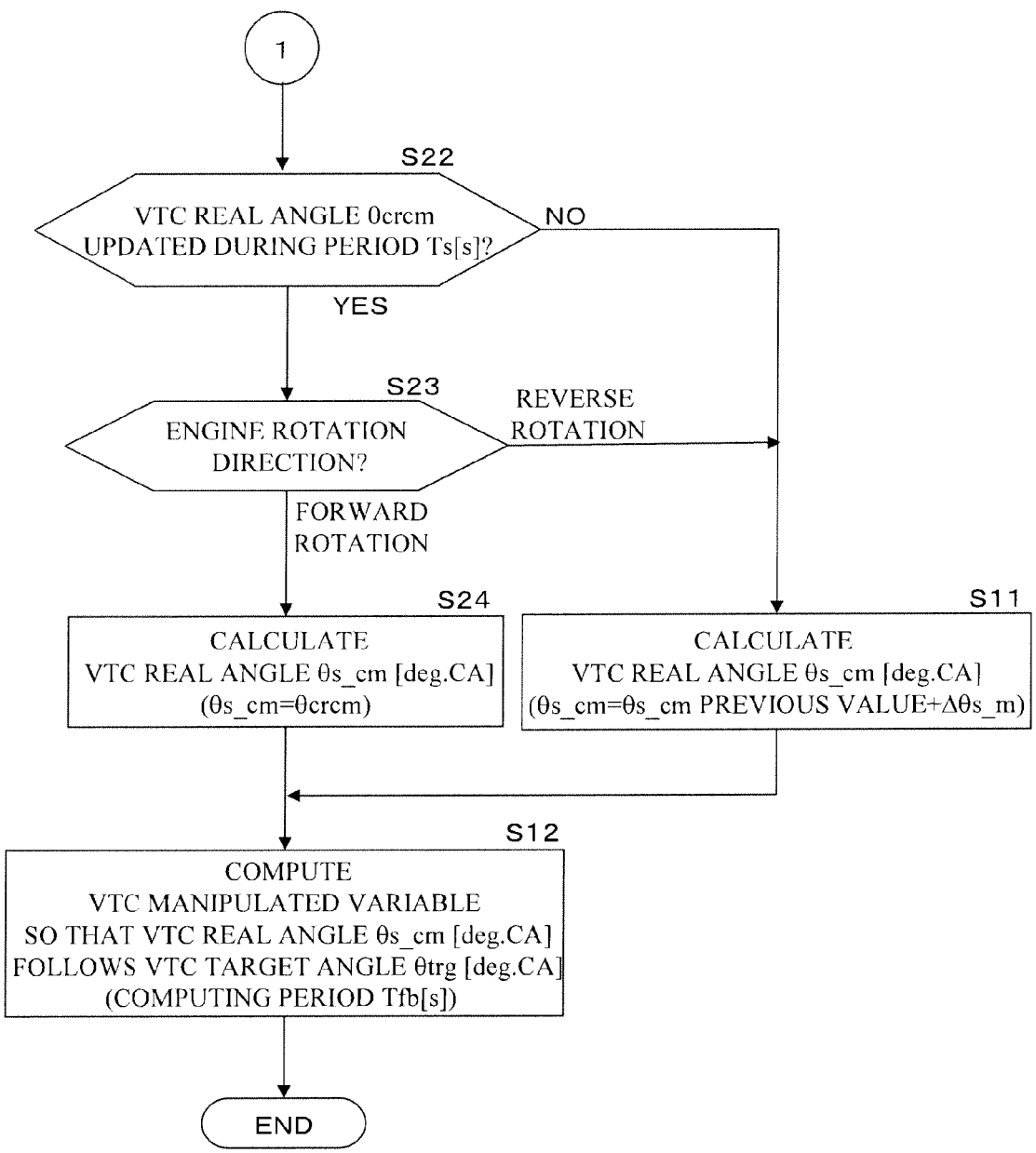
FIG. 17 is a view illustrating a second half of the flowchart of the second embodiment.

FIGS. 16 and 17 illustrate flows of a second embodiment of the valve timing control of intake valve 105. In the embodiment, the rotation phase of intake camshaft 134 is detected basically using cam signal PHASE from cam sensor 133 and rotation signal POS from the crank angle sensor, however, when the reverse rotation is detected, and when the detection of the rotation phase of intake camshaft 134 has not been updated in the manner described above in the control period even during forward rotation, similarly to the first embodiment, the rotation phase of intake camshaft 134 is detected using rotation signal POS from crank angle sensor 117 and the rotation angle of the motor shaft detected by motor rotation sensor 201.

Steps which are different from the first embodiment are mainly described.

In Step 21 after Step 1, VTC real angle θcrcm [deg.CA] (rotation phase of intake camshaft 134=the valve timing of intake valve 105) is calculated using cam signal PHASE from cam sensor 133 and rotation signal POS from the crank angle sensor. Specifically, as described above, VTC real angle θcrcm [deg.CA] (the real valve timing of intake valve 105) is detected by counting the number of generations of rotation signals POS from the reference crank angle position to single cam signal PHASE or the first signal of a plurality of cam signals PHASE which are output in succession.

After that, in Step 22, it is determined whether VTC real angle θcrcm [deg.CA] is updated during control period Ts [s], after computation process is performed similarly to the first embodiment from Step 2 to Step 10, In a case in which it is determined that VTC real angle θcrcm [deg.CA] is updated during control period Ts [s], the process proceeds to Step 23.

In Step 23, it is determined whether the rotation of the engine rotates in reverse direction based on rotation signal POS from crank angle sensor 117.

When it is determined that the rotation of the engine is maintained in the forward direction, the process proceeds to Step 24. In Step 24, VTC real angle θcrcm [deg.CA], which is calculated based on cam signal PHASE from cam sensor 133 and rotation signal POS from crank angle sensor 117 in Step 21, is set as final VTC real angle θs_cm [deg.CA].

Meanwhile, in Step 23, when it is determined that VTC real angle θcrcm [deg.CA] is not updated during control period Ts[s], the process proceeds to Step 11. In Step 11, VTC real angle θs_cm [deg.CA] is calculated by the following expression using the calculation result of Step 2 to Step 10 based on rotation angle θf_m [deg.] of the motor shaft and rotation signal POS similarly to the first embodiment.

$$\theta s\_cm = \theta s\_cm \text{ previous value} + \Delta \theta s\_cm$$

Further, in Step 12, the VTC manipulated variable is computed so that VTC real angle θs_cm [deg.CA] which is calculated in any one of Step 24 and Step 11 follows VTC target angle θtrg [deg.CA].

In the second embodiment described above, advantageous effects as described below can be obtained.

When VTC real angle θcrcm [deg.CA] is not able to be updated during reverse rotation of the crankshaft and in the control period, VTC real angle θs_cm [deg.CA] is calculated using the rotation angle of the motor shaft and thereby the detection accuracy can be increased while the misdetection of the VTC real angle is suppressed.

Meanwhile, in a case in which the VTC real angle is updated during the setting period and the rotation of the engine rotates in the forward direction, the manner in which VTC real angle θcrcm [deg.CA] is directly detected based on cam signal PHASE from cam sensor 133 and rotation signal POS from the crank angle sensor, is more effective to detect the VTC real angle with high accuracy, compared to the manner in which the detection is performed using the rotation angle of the motor shaft because reducer 8 is not intervened, correspondingly.

Thus, in most driving region in which the forward rotation of the engine is maintained and the detection of VTC real angle θcrcm [deg.CA] which is detected based on cam signal PHASE and rotation signal POS can be updated in the control period, VTC real angle θcrcm [deg.CA] is used as final VTC real angle θs_cm [deg.CA] so that the detection accuracy can be secured as much as possible.

As described above, according to each of the engine states, VTC real angle θs_cm [deg.CA], which is calculated further appropriately, is selected and thereby the accuracy of the control of the valve timing of the intake valve can be increased as much as possible.

Figure 18:
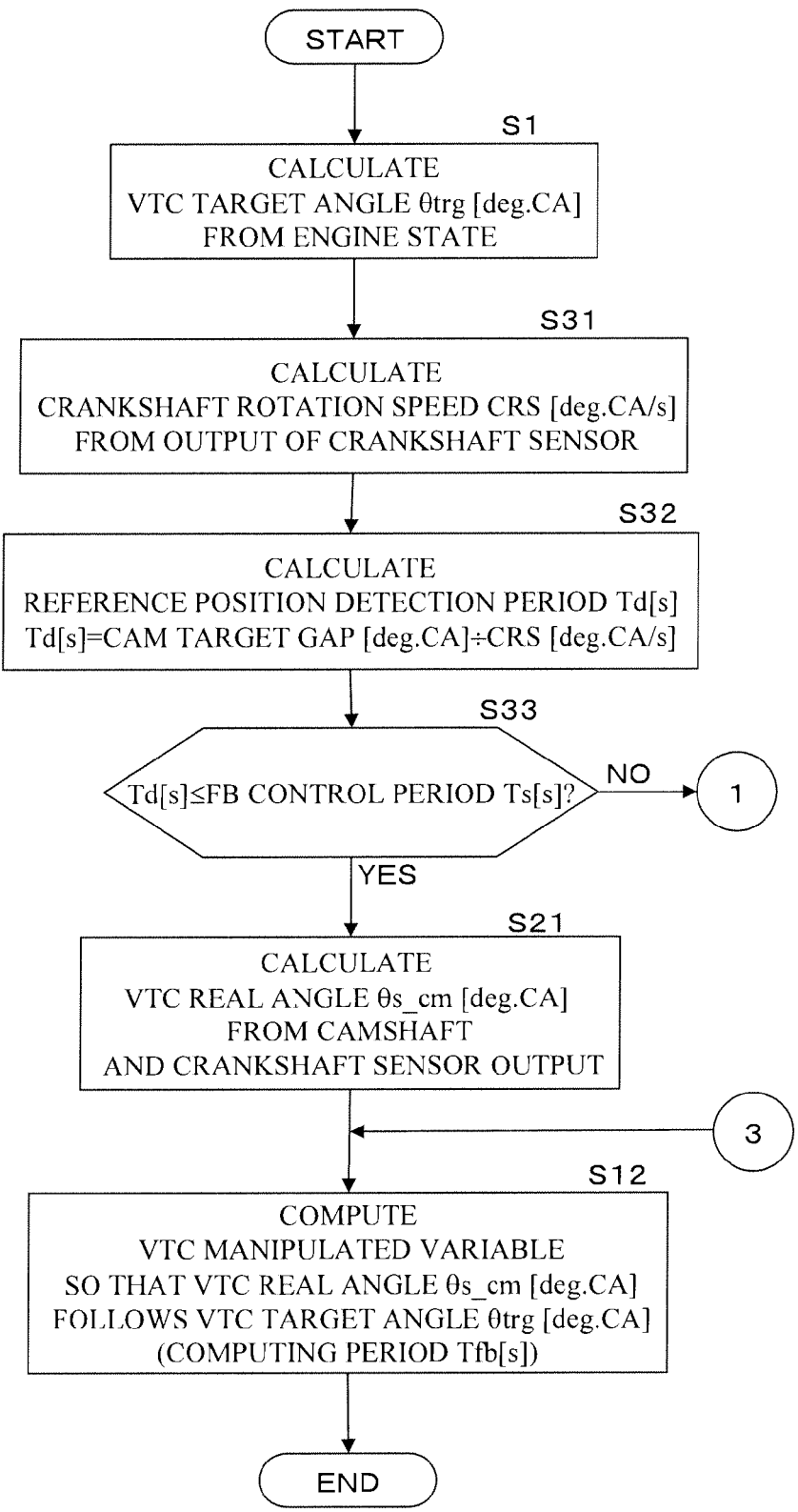
FIG. 18 is a view illustrating a portion of a flowchart of a third embodiment of valve timing control of an intake valve by the variable valve timing mechanism.
Figure 19:
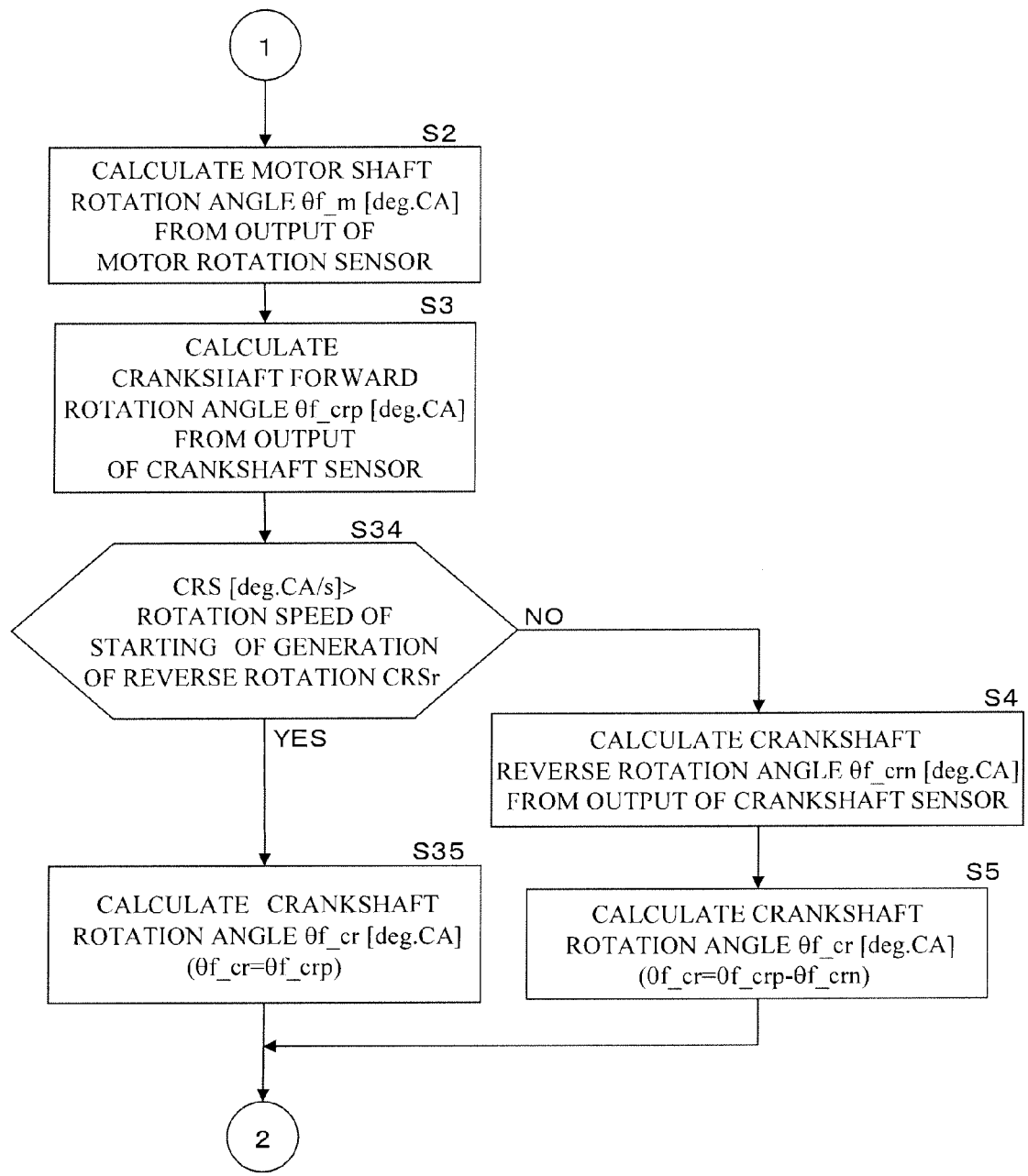
FIG. 19 is a view illustrating a portion of the flowchart of the third embodiment.
Figure 20:
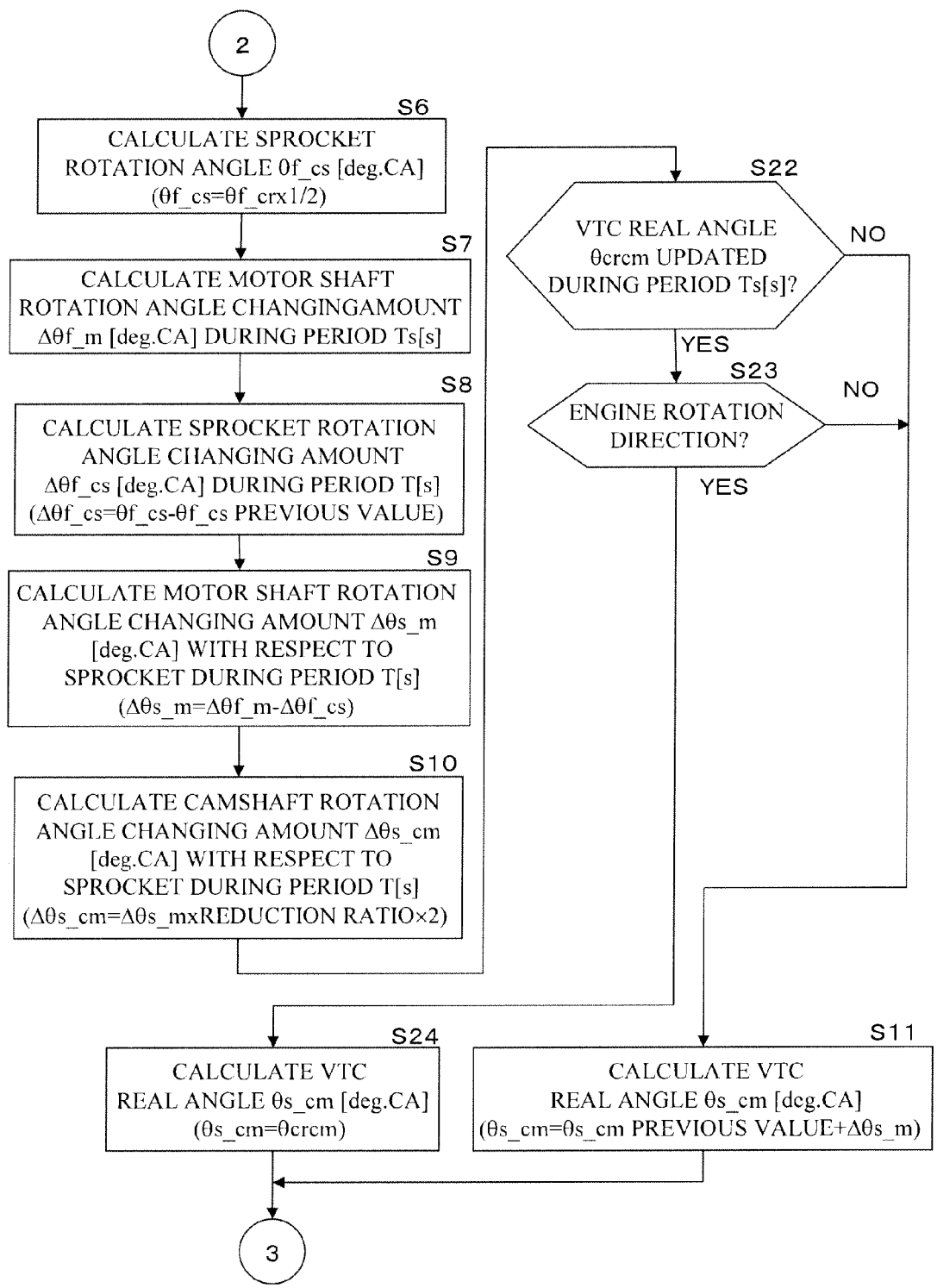
FIG. 20 is a view illustrating a portion of the flowchart of the third embodiment.

FIGS. 18 to 20 illustrate flows of a third embodiment of the control of the valve timing of intake valve 105. In the embodiment, VTC real angle θs_cm [deg.CA], which is calculated further appropriately according to each of the engine states similarly to the second embodiment, is selected, and meanwhile, VTC real angle θs_cm [deg.CA] is calculated only when needed using rotation angle of the motor shaft so that the computation load is further reduced.

The third embodiment is described below chiefly focusing on steps different from those of the second embodiment.

In Step 31 following Step 1, crankshaft rotation speed (the rotation speed of the engine) CRS [deg.CA/s] is calculated based on rotation signal POS from crank angle sensor 117. Specifically, the rotation speed can be calculated in a manner in which the rotation speed is set as a value which is proportional to the counted value of the number of inputs of the rotation signal POS per unit time.

Next, in Step 32, detection period Td of the reference crank position is calculated. The detection period is calculated by dividing the stroke phase difference (180° in the embodiment) between cylinders by the aforementioned crankshaft rotation speed CRS [deg.CA/s]. In addition, the detection period coincides with the detection period of the cam signal for each cylinder for the detection of the VTC real angle.

Thus, in Step 33, detection period Td [s] calculated as described above is compared with a detection period of the required crank angle position of the feedback control of the valve timing using the electric VTC 113; in other words, control period Ts [s] and it is determined whether detection period Td [s] is equal to or less than control period Ts [s].

When it is determined that Td [s]≤Ts [s], the detected value of VTC real angle θcrcm [deg.CA], which is detected by using cam signal PHASE and rotation signal POS from the crank angle sensor, is updated one time or more during control period Is [s], and therefore, it can be determined that favorable feedback control can be performed using the detected value. In Step 21, VTC real angle θcrcm [deg.CA] is calculated using cam signal PHASE and rotation signal POS from the crank angle sensor, and VTC real angle θcrcm [deg.CA] is set as final VTC real angle θs_cm [deg.CA].

When Td [s]>Ts [s] is determined in Step 33, it is determined that there is a case in which the value of VTC real angle θcrcm [deg.CA] detected by using the cam signal is not updated during the control period, and the process proceeds to Step 2 and subsequent steps.

Then, in Step 2, rotation angle of the motor shaft is calculated. In Step 3, the forward rotation angle of the crankshaft in the forward rotation direction is calculated. Thereafter, the process proceeds to Step 34. In Step 34, it is determined whether crankshaft rotation speed CRS [deg.CA/s] calculated in Step 31 exceeds a limit rotation speed (the rotation speed of starting of the generation of the reverse rotation) CRSr where the reverse rotation is likely to occur.

When it is determined that the crankshaft rotation speed exceeds the rotation speed of starting of the generation of the reverse rotation CRSr in Step 34, it is determined that the reverse rotation does not occur. Then, in Step 35, crankshaft forward rotation angle θf_crp [deg.CA] calculated in Step 3 is set as final crankshaft rotation angle θf_cr [deg.CA].

When it is determined that the crankshaft rotation speed does not exceed the rotation speed of starting of the generation of the reverse rotation CRSr in Step 34, crankshaft reverse rotation angle θf_crn [deg.CA] and final rotation angle θf_cr [deg.CA] of the shaft are calculated sequentially in Steps 4 and 5.

After final crankshaft rotation angle θf_cr [deg.CA] is set and calculated in Step 35 or Step 5 as described above, the process proceeds to Step 7 and subsequent steps, and the same process as Step 7 and subsequent steps in the second embodiment is performed. In other words, after camshaft rotation angle changing amount Δθs_cm [deg.CA] is calculated (Step 6 to Step 10), VTC real angle θcrcm [deg.CA] obtained by using cam signal PHASE and rotation signal POS is updated during control period Ts [s]. In addition, when the engine rotates in the forward direction, VTC real angle θs_cm [deg.CA] is set as final VTC real angle θs_cm [deg.CA] (Steps 22, 23, and 24), and when VTC real angle θs_cm [deg.CA] is not updated or the crankshaft rotates in the reverse direction during period Ts0, VTC real angle θs_cm [deg.CA] is calculated using the motor shaft rotation angle (Steps 22 and 11).

Then, in Step 12, the VTC manipulated variable is computed so that VTC real angle θs_cm [deg.CA] calculated in Step 21, Step 35, or Step 5 follows VTC target angle θtrg [deg.CA].

In the third embodiment, similarly to the second embodiment, when VTC real angle θcrcm [deg.CA] is misdetected by the reverse rotation of the crankshaft based on cam signal PHASE and rotation signal POS, and when VTC real angle θcrcm [deg.CA] cannot be updated during the control period, the misdetection is suppressed or the detection accuracy is increased by calculating VTC real angle θs_cm [deg.CA] using the motor shaft rotation angle. In other driving regions, the detection accuracy can be secured by using VTC real angle θcrcm [deg.CA] based on cam signal PHASE and rotation signal POS, by which the accuracy of the control of the valve timing of the intake valve can be increased as much as possible.

In addition, in a case in which it is estimated that VTC real angle θcrcm [deg.CA] based on cam signal PHASE and rotation signal POS is updated during the required control period of the feedback control, VTC real angle θcrcm [deg.CA] is set as final VTC real angle θs_cm [deg.CA] without calculating VTC real angle θs_cm [deg.CA] based on the motor shaft rotation angle, by which wasteful computation load can be reduced.

In addition, the crank angle position is calculated so as to support the case in which reverse rotation occurs in the low rotation area in which the reverse rotation is likely to occur according to the crankshaft rotation speed (the rotation speed of the engine) CRS (Step 4), the calculation process for the case of reverse rotation (Step 4) is omitted in the rotation speed in which the reverse rotation does not occur. Thereby, wasteful computation load also can be reduced.

In addition, in the third embodiment described above, in the low rotation area in which the reverse rotation is likely to occur, it is thought that the probability that VTC real angle θcrcm [deg.CA] is updated during control period Ts [s] is low. Accordingly, the process may proceed to Step 11, omitting the determination of Step S22 and Step S23, to calculate VTC real angle θs_cm [deg.CA] using the motor shaft rotation angle, by which the load of the computation can be further reduced.

In addition, in the embodiments described above, since the electric motor has a structure in which the motor main body containing the stator integrally rotates with the sprocket, the motor shaft is driven to rotate only when the valve timing (the rotation phase of the camshaft) is changed, and only electric power that is necessary for holding the motor shaft is consumed when the valve timing is held. In contrast, in the case of a structure of the electric VTC where stator of the electric motor is fixed to the cover as disclosed in Japanese Patent No. 4123127, the rotation speed of the electric motor is increased and decreased with respect to the motor shaft rotation speed (the rotation speed where the valve timing is held) where the camshaft is rotated at the same speed as the sprocket to change the value timing, and therefore it always requires high-speed rotation drive.

Accordingly, the structure of the embodiments where the motor shaft is driven only when the valve timing is changed is employed, by which the power consumption of the electric motor can be greatly decreased compared to the structure of Japanese Patent No. 4123127. However, the present invention includes a configuration which is applied to the electric VTC having the structure of Japanese Patent No. 4123127.

In the embodiments described above, there has been described the configuration where the motor shaft rotation angle is linearly detected as the motor rotation sensor. A motor rotation sensor having a configuration similar to the crank angle sensor, however, may be used. In other words, as the detected portion, a signal plate, where a number of projections are formed at the end portion of the motor shaft in the circumferential direction, is disposed, and then two signals, which are different in the phases from each other, are generated as detection pulse signals. By comparing these two signals, the rotation angle can be detected at an arbitrary timing while determining the forward rotation and the reverse rotation similarly to the crank angle sensor.

In addition, the configuration, in which a brushless motor is used as the electric motor, and the motor shaft rotation angle is calculated while the forward rotation and the reverse rotation of the motor shaft rotation angle are determined based on an electrical angle which is detected by an electrical angle sensor arranged in the control unit or estimated from a motive voltage or the like, may be provided.

In the embodiments described above, the present invention is applied to the control of switching between the valve timing for the mirror cycle operation of the intake valve and the valve timing for the starting. Even in the case of an engine where the mirror cycle operation is not performed, however, the valve timing for the starting can be optimally set.

In addition, in an electric VTC in which the valve timing of an exhaust valve is changed by an electric motor, the present invention is also applicable to controlling the exhaust valve at a valve timing suitable for starting during engine stopping process or the like.

The entire contents of Japanese Patent Application No. 2011-205391, filed September 20 are incorporated herein by reference.

While only a select embodiment has been chosen to illustrate the present invention, it will be apparent to those skilled in the art from this disclosure that various change and modification can be made herein without departing from the scope of the invention as defined in the appended claims.

Furthermore, the foregoing description of the embodiments according to the present invention are provided for illustration only, and not for the purpose of limiting the invention, the invention as claimed in the appended claims and their equivalents.

What is claimed is:

1. A control device of a variable valve timing mechanism in an internal combustion engine, comprising:
   a crank angle sensor which detects a rotation angle of a crankshaft;
   a cam sensor which detects a rotation angle of a camshaft for opening and closing an engine valve;
   a first rotation phase detection unit which detects a rotation phase of the camshaft with respect to the crankshaft based on respective signals from the crank angle sensor and the cam sensor;
   an actuator which relatively rotates the camshaft with respect to the crankshaft and is capable of changing the rotation phase;
   a control unit which drives the actuator based on the detected value of the rotation phase and performs feedback control to control the rotation phase to approach a target value;
   forward rotation and reverse rotation detection unit which determines and detects forward rotation and reverse rotation of the crankshaft;
   an actuator rotation sensor which detects a rotation operation amount including the rotation direction of the actuator with a frequency higher than a frequency of rotation phase detection by the first rotation phase detection unit; and
   a second rotation phase detection unit which detects a camshaft rotation phase with a frequency higher than a frequency of the first rotation phase detection unit based on the detection result of forward rotation and reverse rotation of the crankshaft and the rotation operation amount including the rotation direction of the actuator.

2. The control device of the variable valve timing mechanism in the internal combustion engine according to claim 1, wherein the control unit uses the detected value of the rotation phase detected by the second rotation phase detection unit to perform feedback control when reverse rotation of the crankshaft is detected or when the rotation phase detected value by the first rotation phase detection unit has not been updated from the previous value at the control timing of the feedback control, and uses the rotation phase detected value by the first rotation phase detection unit to perform feedback control otherwise.

3. The control device of the variable valve timing mechanism in the internal combustion engine according to claim 1, wherein the control unit determines whether a rotation speed of the crankshaft which is detected based on a signal from the crank angle sensor is in an extremely low rotation region in which reverse rotation is likely to occur, and when it is determined that the rotation speed is in the extremely low rotation region, allows rotation phase detection to be performed by the second rotation phase detection unit.

4. The control device of the variable valve timing mechanism in the internal combustion engine according to claim 1, wherein the control unit uses the rotation phase detected value by the first rotation phase detection unit to perform feedback control when a detection period of the rotation phase of the first rotation phase detection unit is below a control period of the variable valve timing mechanism.

5. The control device of the variable valve timing mechanism in the internal combustion engine according to claim 1, wherein:
   a sprocket rotating with the crankshaft and the camshaft are arranged concentrically;
   the actuator is composed of an electric motor, having a motor shaft, which is arranged concentrically with the sprocket and the camshaft, and a motor main body including a stator integrally rotating with the sprocket; and
   the control unit changes the rotation phase by transmitting the rotation of the motor shaft to the camshaft via a reducer to relatively rotate the camshaft with respect to the sprocket.

6. The control device of the variable valve timing mechanism in the internal combustion engine according to claim 1, wherein the control unit performs feedback control to control the rotation phase after stopping to approach a target rotation phase for the starting based on the rotation phase which is detected by the second rotation phase detection unit during engine stopping process.

7. The control device of the variable valve timing mechanism in the internal combustion engine according to claim 1, wherein the control unit sets a target rotation phase in non-starting of an intake valve to a value for a mirror cycle operation and sets the target rotation phase for the starting to a value closer to an intake bottom dead center than the target rotation phase for the non-starting for the engine valve.

8. The control device of the variable valve timing mechanism in the internal combustion engine according to claim 1, wherein the second rotation phase detection unit is formed in a shape where each of the portions divided in plural pieces in a circumferential direction of the rotation shaft at a detected portion fixed on an end portion of the rotation shaft of the actuator is able to be detected in the rotation position continuously by the rotation angle detection unit arranged on the outer side of the detected portion (201A).

9. The control device of the variable valve timing mechanism in the internal combustion engine according to claim 1, wherein the crank angle sensor outputs a rotation signal, the pulse width of which differs between forward rotation and reverse rotation of the crankshaft and the forward rotation and reverse rotation detection unit detects forward rotation and reverse rotation according to the pulse width.

10. A control device of a variable valve timing mechanism in an internal combustion engine, comprising:
a crank angle sensor which detects a rotation angle of a crankshaft;
a cam sensor which detects a rotation angle of a camshaft for opening and closing an engine valve;
first rotation phase detection means for detecting a rotation phase of the camshaft with respect to the crankshaft based on respective signals from the crank angle sensor and the cam sensor;
an actuator which relatively rotates the camshaft with respect to the crankshaft and is able to change the rotation phase;
control means for driving the actuator based on the detected value of the rotation phase and performs feedback control to control the rotation phase to approach a target value;
forward rotation and reverse rotation detection means for determining and detecting forward rotation and reverse rotation of the crankshaft;
actuator rotation detection means for detecting a rotation operation amount including the rotation direction of the actuator with a frequency higher than a frequency of rotation phase detection by the first rotation phase detection means; and
second rotation phase detection means for detecting a camshaft rotation phase with a frequency higher than the first rotation phase detection means, based on the detection result of forward rotation and reverse rotation of the crankshaft and the rotation operation amount including the rotation direction of the actuator.

11. A control method of a variable valve timing mechanism in an internal combustion engine, comprising steps of:
detecting a rotation angle of a crankshaft and a rotation angle of a camshaft for opening and closing an engine valve;
detecting a rotation phase of the camshaft with respect to the crankshaft as a first rotation phase based on respective signals of the rotation angle of a crankshaft and the rotation angle of a camshaft for opening and closing the engine valve;
driving an actuator which relatively rotates the camshaft with respect to the crankshaft and is able to change the first rotation phase and performing feedback control to control the rotation phase to approach a target value based on the detected value of the rotation phase;
determining and detecting forward rotation and reverse rotation of the crankshaft;
detecting a rotation operation amount including the rotation direction of the actuator with a frequency higher than a frequency of the detection of the first rotation phase; and
detecting a rotation phase of the camshaft as a second rotation phase with a frequency higher than a frequency the first rotation phase, based on the detection result of forward rotation and reverse rotation of the crankshaft and the rotation operation amount including the rotation direction of the actuator.

12. The control method of the variable valve timing mechanism in the internal combustion engine according to claim 11, wherein the step of performing feedback control to control the rotation phase to approach a target value includes the step of using the detected value of the second rotation phase to perform a feedback control when reverse rotation of the crankshaft is detected or when the detected value of the first rotation phase has not been updated from the previous value at the control timing of the feedback control, and using the detected value of the first rotation phase to perform feedback control otherwise.

13. The control method of the variable valve timing mechanism in the internal combustion engine according to claim 11, wherein the step of performing feedback control to control the rotation phase to approach a target value includes the step of determining whether a rotation speed of the crankshaft which is detected based on a signal from the crank angle sensor is in an extremely low rotation region in which reverse rotation is likely to occur, and when it is determined that the rotation speed is in the extremely low rotation region, performing the detection of the second rotation phase.

14. The control method of the variable valve timing mechanism in the internal combustion engine according to claim 11, wherein the step of performing feedback control to control the rotation phase to approach a target value includes the step of using the detected value of the first rotation phase to perform feedback control when a detection period of the first rotation phase is below a control period of the variable valve timing mechanism.

15. The control method of the variable valve timing mechanism in the internal combustion engine according to claim 11, wherein:
a sprocket rotating with the crankshaft and the camshaft are arranged concentrically;
the actuator is composed of an electric motor, having a motor shaft, which is arranged concentrically with the sprocket and the camshaft, and a motor main body including a stator integrally rotating with the sprocket; and
the step of performing feedback control to control the rotation phase to approach a target value includes the step of changing the rotation phase by transmitting the rotation of the motor shaft to the camshaft via a reducer to relatively rotate the camshaft with respect to the sprocket.

16. The control method of the variable valve timing mechanism in the internal combustion engine according to claim 11, wherein the step of performing feedback control to control the rotation phase to approach a target value includes the step of performing feedback control so that the rotation phase after stopping approaches a target rotation phase for the starting, based on the rotation phase which is detected as the second rotation phase during stopping of the engine.

17. The control method of the variable valve timing mechanism in the internal combustion engine according to claim 11, wherein the step of performing feedback control to control the rotation phase to approach a target value includes the step of setting a target rotation phase in non-starting of an intake valve to a value for a mirror cycle operation, and setting the target rotation phase for the starting to a value closer to an intake bottom dead center than the target rotation phase for the non-starting for the engine valve.

18. The control method of the variable valve timing mechanism in the internal combustion engine according to claim 11, wherein the step of determining and detecting forward rotation and reverse rotation of the crankshaft includes the step of the crank angle sensor outputting a rotation signal, the pulse width of which differs between forward rotation and reverse rotation of the crankshaft and detecting forward rotation and reverse rotation according to the pulse width.

* * * * *